(12) United States Patent
Nishijima

(10) Patent No.: US 8,379,421 B2
(45) Date of Patent: Feb. 19, 2013

(54) POWER FACTOR CORRECTION CONVERTER WITH PARALLEL-CONNECTED CONVERTER SECTIONS

(75) Inventor: Kimihiro Nishijima, Oita (JP)

(73) Assignee: Oita University (JP)

( * ) Notice: Subject to any disclaimer, the term of this patent is extended or adjusted under 35 U.S.C. 154(b) by 0 days.

(21) Appl. No.: 12/680,859

(22) PCT Filed: Feb. 24, 2010

(86) PCT No.: PCT/JP2010/052886
§ 371 (c)(1),
(2), (4) Date: Mar. 30, 2010

(87) PCT Pub. No.: WO2010/143453
PCT Pub. Date: Dec. 16, 2010

(65) Prior Publication Data
US 2012/0120696 A1    May 17, 2012

(30) Foreign Application Priority Data

Jun. 10, 2009  (JP) ................................ 2009-139195

(51) Int. Cl.
| | |
|---|---|
| G05F 1/00 | (2006.01) |
| G05F 5/00 | (2006.01) |
| G05F 1/24 | (2006.01) |
| H02M 7/68 | (2006.01) |
| H02M 5/42 | (2006.01) |
| H02M 7/48 | (2006.01) |
| B23F 9/10 | (2006.01) |

(52) U.S. Cl. .......... 363/84; 323/272; 323/299; 323/207; 323/344; 323/345; 323/271; 363/89; 363/71

(58) Field of Classification Search .................. 323/266, 323/272, 205, 207, 299, 270, 271; 363/44, 363/84, 89, 90
See application file for complete search history.

(56) References Cited

U.S. PATENT DOCUMENTS

| | | | | |
|---|---|---|---|---|
| 6,288,918 | B1 * | 9/2001 | Tarodo et al. | 363/44 |
| 6,504,497 | B2 * | 1/2003 | Jang et al. | 341/125 |
| 6,538,906 | B1 * | 3/2003 | Ke et al. | 363/21.02 |
| 7,729,143 | B2 * | 6/2010 | Lin et al. | 363/65 |
| 7,888,919 | B2 * | 2/2011 | Dishman et al. | 323/266 |
| 7,928,701 | B2 * | 4/2011 | Usui | 323/206 |
| 8,138,731 | B2 * | 3/2012 | Chen | 323/272 |
| 2009/0027931 | A1 | 1/2009 | Usui | |

FOREIGN PATENT DOCUMENTS

| | | |
|---|---|---|
| JP | 8-126303 A | 5/1996 |
| JP | 2007-195282 A | 8/2007 |
| JP | 2008-278679 A | 11/2008 |

\* cited by examiner

*Primary Examiner* — Bao Q Vu
*Assistant Examiner* — Zekre Tsehaye
(74) *Attorney, Agent, or Firm* — Akerman Senterfitt

(57) ABSTRACT

When a commercial power supply E operates normally, converter sections PFC1, PFC2 connected in parallel to each other can operate to approximate the input current from the commercial power supply E to the waveform and phase of the input voltage to correct a power factor while supplying stabilized output voltages Vo1, Vo2 to a load. When the voltage of the commercial power supply E drops, the smoothing capacitor Co1 operates as an input power supply to power the converter section PFC2, which allows the smoothing capacitor Co2 to supply the stabilized output voltage Vo2 to the load.

6 Claims, 26 Drawing Sheets

POWER FACTOR CORRECTION CONVERTER WITH PARALLEL-CONNECTED CONVERTER SECTIONS

TECHNICAL FIELD

The present invention relates to a power factor correction (PFC) converter and, more particularly, to a PFC converter that can stabilize output voltage even in the event of a power failure or instantaneous power failure.

BACKGROUND ART

In order to suppress AC input line harmonics, a power factor correction (PFC) converter is used, such as disclosed in Patent Document 1, for example. The PFC converter is a circuit for correcting power factor by approximating the waveform and phase of input current to the input voltage waveform. FIG. 25 shows a typical boost PFC converter. Further, FIG. 26 shows two PFC converter sections (PFC1 and PFC2) connected in parallel to each other.

The circuits shown in FIGS. 25 and 26 include a diode bridge Db for full-wave rectifying AC input voltage Vi from a commercial power supply E as input power supply, and a first converter section PFC1 being applied with rectification output from the diode bridge Db (rectifier). The first converter section PFC1 includes a series circuit of a first inductor L1 and a first switching element S1, connected between the output terminals of the diode bridge Db, and a first rectification element D1 as a diode with one end (anode) connected to the connecting point of the inductor L1 and the switching element S1. Also, a smoothing capacitor Co is connected between the output terminals of the converter section PFC1, i.e., between the other end (cathode) of the rectification element D1 and the connecting point of the diode bridge Db and the switching element S1. Then, output terminals +V, −V for generating DC output voltage Vo are connected across the smoothing capacitor Co.

The circuit configuration described above is common to FIGS. 25 and 26. In addition, in FIG. 26, the first converter section PFC1 and a second converter section PFC2 are connected in parallel between the diode bridge Db and the smoothing capacitor Co. As shown, the converter section PFC2 includes a series circuit of a second inductor L2 and a second switching element S2, connected between the output terminals of the diode bridge Db, and a second rectification element D2 as a diode with one end (anode) connected to the connecting point of the inductor L2 and the switching element S2. The smoothing capacitor Co is also connected between the output terminals of the converter section PFC2.

As shown in FIG. 26, the power capacity of the overall PFC converter can be increased by increasing the number of the converter sections PFC1, PFC2 and so on connected in parallel. Also, the ripple in input current and output current can be reduced by causing a phase shift between the converter sections PFC1 and PFC2, and then switching-driving the switching elements S1 and S2 of the converter sections PFC1 and PFC2, respectively.

RELATED ART DOCUMENTS

Patent Document

Patent Document 1: Japanese Patent Application Laid-Open No. 2008-278679

DISCLOSURE OF THE INVENTION

Problems to be Solved by the Invention

The above-described PFC converter, with a large-capacity smoothing capacitor Co connected to the output side thereof, protects electronic devices connected to the output side thereof from a power failure or instantaneous power failure of the commercial power supply E by storing energy in the smoothing capacitor Co. However, when energy is discharged from the smoothing capacitor Co in the event of a power failure or instantaneous power failure of the commercial power supply E, the voltage across the smoothing capacitor Co, i.e., the output voltage Vo of the PFC converter drops accordingly. Therefore, in order to obtain a sufficient length of output holding time in the event of a power failure or instantaneous power failure, a large-capacity smoothing capacitor needs to be attached to the output of the PFC converter, and a power supply circuit for stabilizing the voltage also needs to be added in the subsequent stage of the PFC converter.

In view of the above-described problem, it is an object of the present invention to provide a PFC converter in which a smoothing capacitor can be small in size and a power supply circuit connected to the subsequent stages can, for example, be simple, efficient, low-cost, small in size and lightweight through the functionality of the PFC converter itself of preventing the output voltage from dropping in the event of a power failure or instantaneous power failure of an input power supply.

Means for Solving the Problems

A PFC converter with parallel-connected converter sections in accordance with is provided.

A PFC converter with two parallel-connected converter sections is configured to include a first converter section and a second converter section, connected in parallel with each other, to which AC voltage or rectified voltage from an input power supply is input. A first capacitor is connected across positive and negative output terminals of the first converter section A second capacitor is connected across positive and negative output terminals of the second converter section, in which, when the input power supply operates normally, the first and the second converter sections are allowed to operate as a parallel-connected PFC converter to transmit energy from the input power supply to the first and the second capacitors, respectively, so that stabilized output voltages will be supplied from the first and the second capacitors to a load, in which, when the voltage of the input power supply drops, the second converter section is allowed to operate to transmit energy from the first capacitor to the second capacitor, so that stabilized output voltage will be supplied from the second capacitor to the load. The first converter section is configured such that a series circuit of a first inductor and a first switching element is connected across input terminals of the first converter, and a series circuit of a first switching element and a first rectification element is connected across both terminals of the first capacitor. The second converter section is configured such that a series circuit of a second inductor and a second switching element is connected across input terminals of the second converter section. A series circuit of a second switching element and a second rectification element is connected across both terminals of the second capacitor. A first switch is connected in parallel with the first rectification element and when the input power supply operates normally, the first switch is turned off to allow the first and second switching elements to perform a switching operation. When a voltage of the input power supply drops, the first switch is turned on to allow the second switching element to perform a switching operation.

Also, the PFC converter with two parallel-connected converter sections may be configured as follows. The first switch is comprised of a third switching element. When the input power supply operates normally, the third switching element is turned off and the first and the second switching elements are allowed to perform switching operation. And when the voltage of the input power supply drops, the third switching element is turned on and the second switching element is caused to perform switching operation, and before the second switching element is turned on, the first switching element is temporarily set to ON and the third switching element is temporarily turned off so that energy stored in the first and the second inductors will be completely discharged.

Further, the PFC converter with two parallel-connected converter sections may be configured such that, when the voltage of the input power supply drops, before the first switching element is turned on, both the first and the third switching elements are turned off so that energy stored across the first switching element will be completely discharged.

Also, the PFC converter with two parallel-connected converter sections may be configured as follows: the first converter with two parallel-connected converter sections includes a first converter section and a second converter section, connected in parallel with each other to which AC voltage or rectified voltage from an input power supply is input, a first capacitor connected across positive and negative output terminals of the first converter section, and a second capacitor connected across positive and negative output terminals of the second converter section, in which when the input power supply operates normally, the first and second converter sections are allowed to operate as a parallel-connected PFC converter to transmit energy from the input power supply to the first and second capacitors, respectively, so that stabilized output voltages are supplied from the first and second capacitors to a load, whereas a voltage of the input power supply drops, the second converter section is allowed to operate to transmit energy from the first capacitor to the second capacitor, so that stabilized output voltages from the second capacitor to the load. The first converter section is configured such that a series circuit of a first inductor and a first switching element is connected across input terminals of the first converter section, and a series circuit of the first switching element and a third switching element is connected across the first capacitor. The second converter section is configured such that a series circuit of a second inductor and a second switching element is connected between the input terminals of the second converter section, and a series circuit of the second switching element and a fourth switching element is connected across the second capacitor. When the input power supply operates normally, the first and the second switching elements are caused to perform switching operation. And when the voltage of the input power supply drops, the following operations are performed in this order: in a first period, the second and the third switching elements are turned on and the first and the fourth switching elements are turned off to store energy from the first capacitor in the first and the second inductors; in a second period, the third switching element is turned on and the first, the second and the fourth switching elements are turned off to completely discharge energy stored across the fourth switching element; in a third period, the third and the fourth switching elements are turned on and the first and the second switching elements are turned off to discharge energy stored in the first and the second inductors and the first capacitor to the second capacitor; in a fourth period, the fourth switching element is turned on and the first, the second and the third switching elements are turned off to completely discharge energy stored across the first switching element; in a fifth period subsequent thereto, the first and the fourth switching elements are turned on and the second and the third switching elements are turned off to discharge energy stored in the first and the second inductors to the second capacitor; in a sixth period, the first switching element is turned on and the second, the third and the fourth switching elements are turned off to completely discharge energy stored across the second switching element; in a seventh period, the first and the second switching elements are turned on and the third and the fourth switching elements are turned off; and in an eighth period, the second switching element is turned on and the first, the third and the fourth switching elements are turned off to completely discharge energy stored across the third switching element.

Also, the PFC converter with two parallel-connected converter sections may be configured as follows: the PFC converter with two parallel-connected converter sections includes: a first converter section and a second converter section, connected in parallel with each other, to which rectified voltage from an input power supply is input, a first capacitor connected across positive and negative output terminals of the first converter section, and a second capacitor connected across positive and negative output terminals of the second converter section. When the input power supply operates normally, the first and second converter sections are allowed to operate as a parallel-connected PFC converter to transmit energy from the input power supply to the first and second capacitors, so that a stabilized output voltage is supplied from the first and second capacitors to a load, whereas when a voltage of the input power supply drops, the second converter section is allowed to operate to transmit energy from the first capacitor to the second capacitor, so that stabilized voltages are supplied from the second capacitor to the load. The first converter is configured such that a series circuit of a first switching element and a third switching element is connected across both terminals of the first capacitor, and a first inductor is connected with a connecting point of first and third switching elements. While the second converter section is configured such that a series circuit of the second switching element and a fourth switching element is connected across the second capacitor, and a second inductor is connected across both terminals of the second capacitor, and a second inductor is connected with a connecting point with the second and fourth switching elements and with one end of the input power supply. The output terminals of the first converter section are connected to the output terminals of the second converter section through a second switch. When the input power supply operates normally, the second switch is turned on, and when the voltage of the input power supply drops, the second switch is turned off.

Also, the PFC converter may be configured such that, when the input power supply recovers to normal operation, the first and the second converter sections are caused to operate again, and the first capacitor is charged through the first converter section, and the stabilized output voltage is supplied from the second capacitor to the load through the second converter section.

Effects of the Invention

With the means above, the present invention can achieve the following effects.

With the above-described configuration, when the input power supply operates normally, the first and the second converter sections connected in parallel to each other can operate to approximate the input current from the input power supply to the waveform and phase of the input voltage to correct power factor while supplying stabilized output voltages to the load. On the other hand, when the voltage of the input power supply drops, causing the second converter section to operate using the first capacitor as the input power supply provides stabilized output voltage from the second capacitor to the load. Therefore, when a power failure or instantaneous power failure occurs in the input power supply, the PFC converter itself will have the functionality of preventing the output voltage from dropping, so that the smoothing capacitors can be small in size and the power supply circuit can, for example, be simple, efficient, low-cost, small in size and lightweight.

Also, when the voltage of the input power supply drops, simply setting the first switch to ON to allow current to flow from the first capacitor to each of the first and the second inductors and simply causing the second switching element of the second converter section to perform switching operation transmits energy from the first and the second inductors to the second capacitor to supply stabilized output voltage to the load.

Also, when the voltage of the input power supply drops, with the currents flowing from the first and the second inductors to the second capacitor reduced to zero, the first switching element and the second rectification element can be turned OFF. This can suppress the switching loss and surge voltage of the first switching element and the second rectification element.

Also, when the voltage of the input power supply drops, with the voltage across the first switching element reduced to zero, the first switching element can be turned ON, which suppresses the switching loss and surge voltage of the first switching element.

Also, when the voltage of the input power supply drops, setting only one of the first to fourth switching elements to ON allows the one of the first to fourth switching elements to be turned ON with the voltages across the first to fourth switching elements reduced to zero, thereby suppressing the switching loss and surge voltage of all of the first to fourth switching elements.

Also, when the input power supply operates normally, the second switch is set to ON to supply power to the load, with the first and the second converter sections connected in parallel to each other; and when the voltage of the commercial power supply E drops, the second switch is set to OFF to prevent energy from returning from the second capacitor to the first smoothing capacitor and to efficiently supply power to the load.

Also, immediately after the recovery of the input power supply to normal operation, supplying a desired output voltage to the load while storing energy in the first capacitor becomes possible.

MODE FOR CARRYING OUT THE INVENTION

Preferred embodiments of the invention are described below in detail with reference to the appended drawings.

Components common to the examples of the prior arts are denoted by like numerals, and the portions that have already been explained are not further explained as far as possible.

First Embodiment

Figure 1:
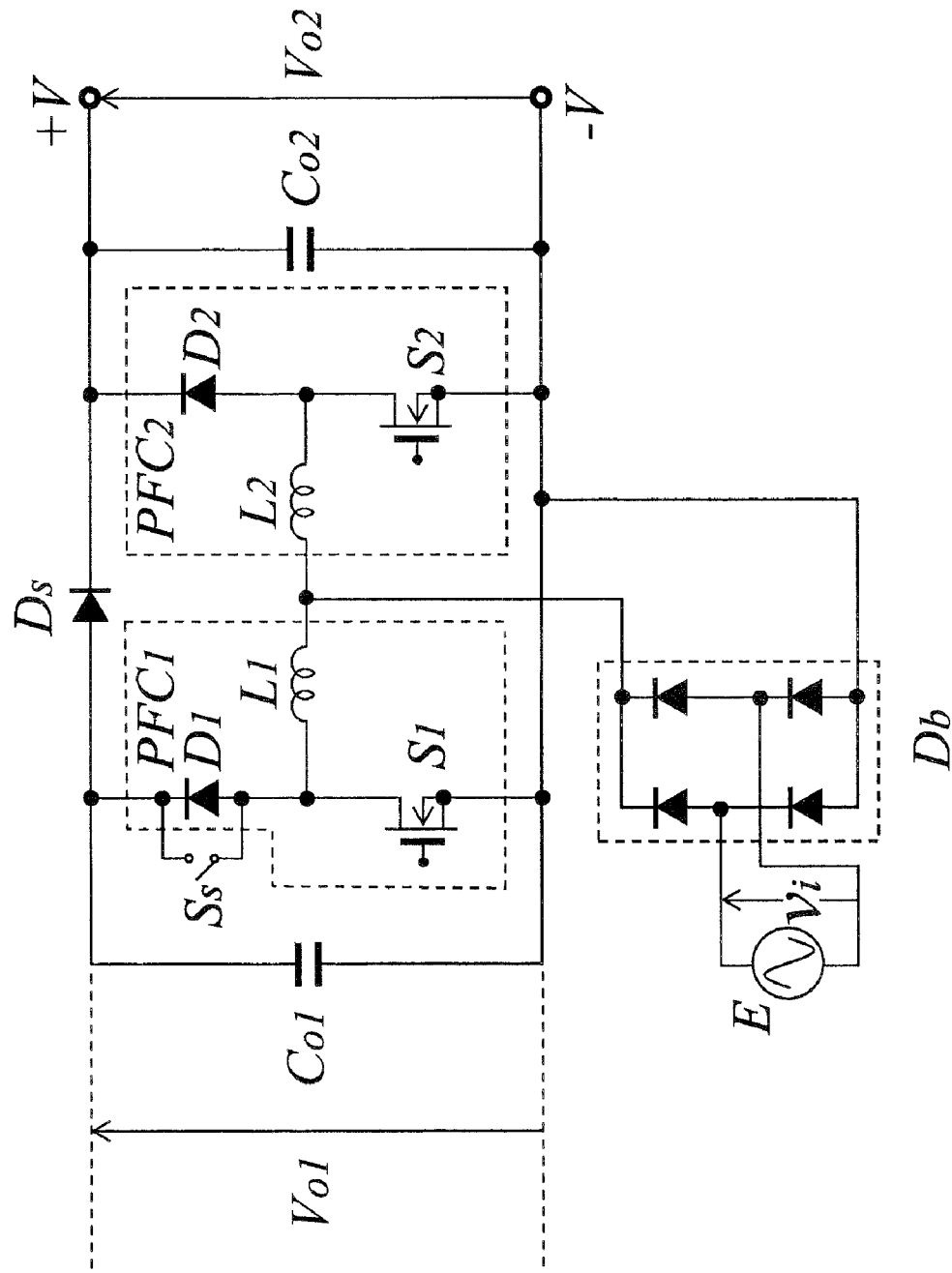
FIG. 1 is a circuit diagram of a PFC converter in accordance with a first embodiment of the invention.

FIG. 1 shows a PFC converter in accordance with a most preferable embodiment of the invention. In FIG. 1, the PFC converter is a two-parallel PFC converter that includes a first converter section PFC1 and a second converter section PFC2, both of which are connected in parallel to each other. For example, the first converter section PFC1 includes a first switching element S1 comprised of a MOS FET, a first inductor L1 and a first rectification element D1. For example, the second converter section PFC2 includes a second switching element S2 comprised of a MOS FET, a second inductor L2 and a second rectification element D2. A first smoothing capacitor Co1 is connected between the output terminals of the first converter section PFC1. A second smoothing capacitor Co2 is connected between the output terminals of the second converter section PFC2. A rectification element Ds is connected between the positive terminal of the first smoothing capacitor Co1 and the positive terminal of the second smoothing capacitor Co2. A switch Ss as a first switch is connected in parallel to the first rectification element D1. In normal operation, each of the converter sections PFC1, PFC2 is caused to operate together so that the PFC converter will operate as one two-parallel or two-phase PFC converter. On the other hand, in the event of a power failure or instantaneous power failure of the commercial power supply E, the converter sections PFC1, PFC2 are caused to operate as one boost PFC converter, preventing the output voltage Vo1 generated across the smoothing capacitor Co2 from dropping. Also, output terminals +V, −V are connected across the second smoothing capacitor Co2. A power supply circuit connected to the output terminals +V, −V can supply a desired power to various electronic devices. The power supply circuit and various electronic devices, all of which are not shown, are a load of the PFC converter.

As another example, any electronic devices that operate at substantially the same voltage as the output voltage from the output terminals +V, −V and needs no isolation may be directly connected to the output terminals +V, −V as the load.

Although not shown in FIG. 1, a control circuit for controlling the switching of the switching elements S1, S2 is provided. The control circuit includes: a first PWM (pulse width modulation) control section for monitoring a first detected voltage proportional to a first output voltage Vo1 generated across the first smoothing capacitor Co1, generating a first pulse drive signal with a pulse width depending on the difference between the first detected voltage and a first reference voltage, and providing the first pulse drive signal to the control terminal (gate) of the first switching element S1; and a second PWM control section for monitoring a second detected voltage proportional to a second output voltage Vo2 generated across the second smoothing capacitor Co2, generating a second pulse drive signal with a pulse width depending on the difference between the second detected voltage and a second reference voltage, and providing the second pulse drive signal to the control terminal (gate) of the second switching element S2.

The first PWM control section controls the switching of the first switching element S1 by determining the pulse width of the first pulse drive signal so that the waveform and phase obtained through the multiplication of the first output voltage Vo1 and the input voltage applied to the first converter section PFC1 will be approximate to the waveform and phase of the input current supplied to the first converter section PFC1. Similarly, the second PWM control section controls the switching of the second switching element S2 by determining the pulse width of the second pulse drive signal so that the waveform and phase obtained through the multiplication of the first output voltage Vo2 and the input voltage applied to the second converter section PFC2 will be approximate to the waveform and phase of the input current supplied to the second converter section PFC2. Such switching control by the PWM control sections approximates the waveform and phase of the input current from the commercial power supply E to the converter sections PFC1, PFC2 to the input voltage Vi having a generally sinusoidal shape to reduce harmonic distortion and correct power factor.

Furthermore, the control circuit in accordance with this embodiment includes a monitoring and controlling section for monitoring the input voltage Vi from the commercial power supply E and controlling the operation of the switching elements S1, S2 and the switch Ss. In other words, the monitoring and controlling section has a function of determining whether or not the input voltage Vi is properly applied to the PFC converter and, depending on the determination result, controlling the operation of the switching elements S1, S2 and the switch Ss.

Next, the operation of the PFC converter shown in FIG. 1 in accordance with the invention is described with reference to FIGS. 2 and 3.

Figure 26:
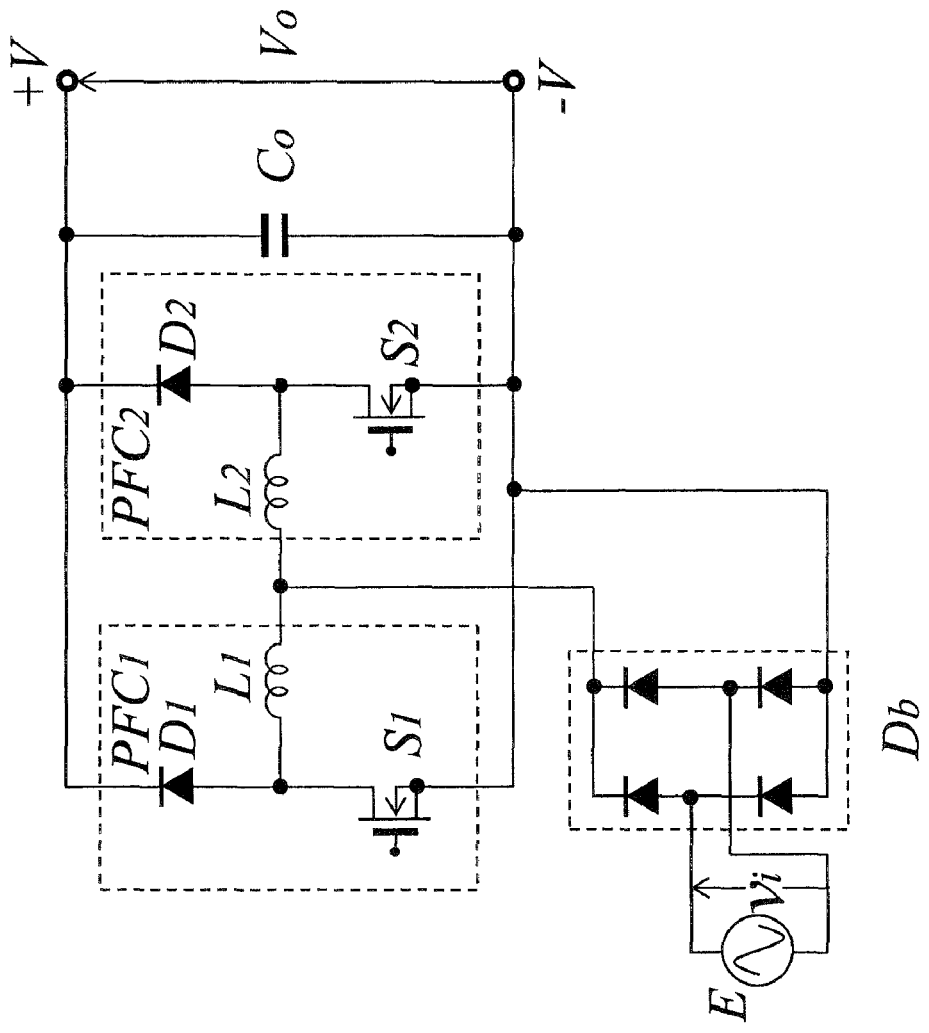
FIG. 26 is a circuit diagram of another PFC converter with converter sections connected in parallel to each other known in prior art.

When neither power failure nor instantaneous power failure occurs in the commercial power supply E and a predetermined input voltage Vi is generated between the AC input lines from the commercial power supply E, the monitoring and controlling section sets the switch Ss to OFF. At this time, the PFC converter operates similarly to a conventional two-parallel boost PFC converter (converter sections PFC1 and PFC2) as shown in FIG. 26 of prior art, in which the first and the second PWM control sections control the switching of the switching elements S1, S2, respectively, as described above, to cause current flowing in the first inductor L1 and the second inductor L2 to operate in continuous current mode or discontinuous current mode or boundary mode and to make the waveform and phase of input current be approximate to the input voltage waveform, thereby correcting power factor. The detailed operations would be apparent to a person skilled in the art and is not specifically described here.

On the other hand, when the input voltage Vi between the AC input lines drops below a predetermined value and the monitoring and controlling section determines that a power failure or instantaneous power failure has occurred in the commercial power supply E, the monitoring and controlling section holds the switch Ss to ON and the switching element S1 to OFF and sets the switching element S2 to ON or OFF depending on the control by the second PWM control section. In this way, the PFC converter in accordance with the invention operates as a boost converter, in which the voltage Vo1 across the smoothing capacitor Co1 acts as the input power supply and the voltage Vo2 across the smoothing capacitor Co2 acts as the output voltage.

Figure 2:
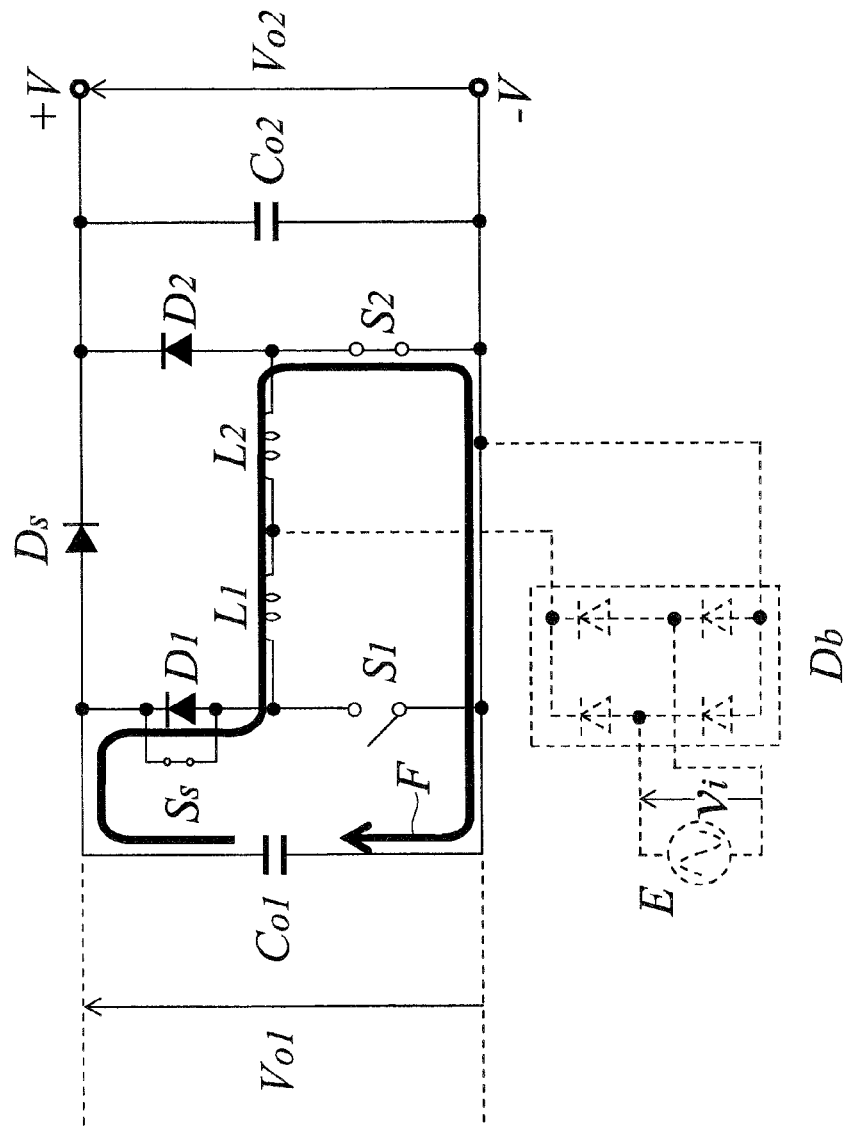
FIG. 2 is an explanatory diagram showing an equivalent circuit of the circuit in FIG. 1 in the event of a power failure or instantaneous power failure.

As shown in FIG. 2, first, in the period during which the switching element S2 is ON, since the switch Ss is also ON, the smoothing capacitor Co1 and the inductors L1, L2 are coupled to form a closed circuit, and current flows as indicated by an arrow F, storing energy from the smoothing capacitor Co1 in the inductors L1, L2. At this time, the rectification element D2 is in an OFF state and a voltage generated across the smoothing capacitor Co2 appears between output terminals +V, −V as the output voltage Vo2.

Figure 3:
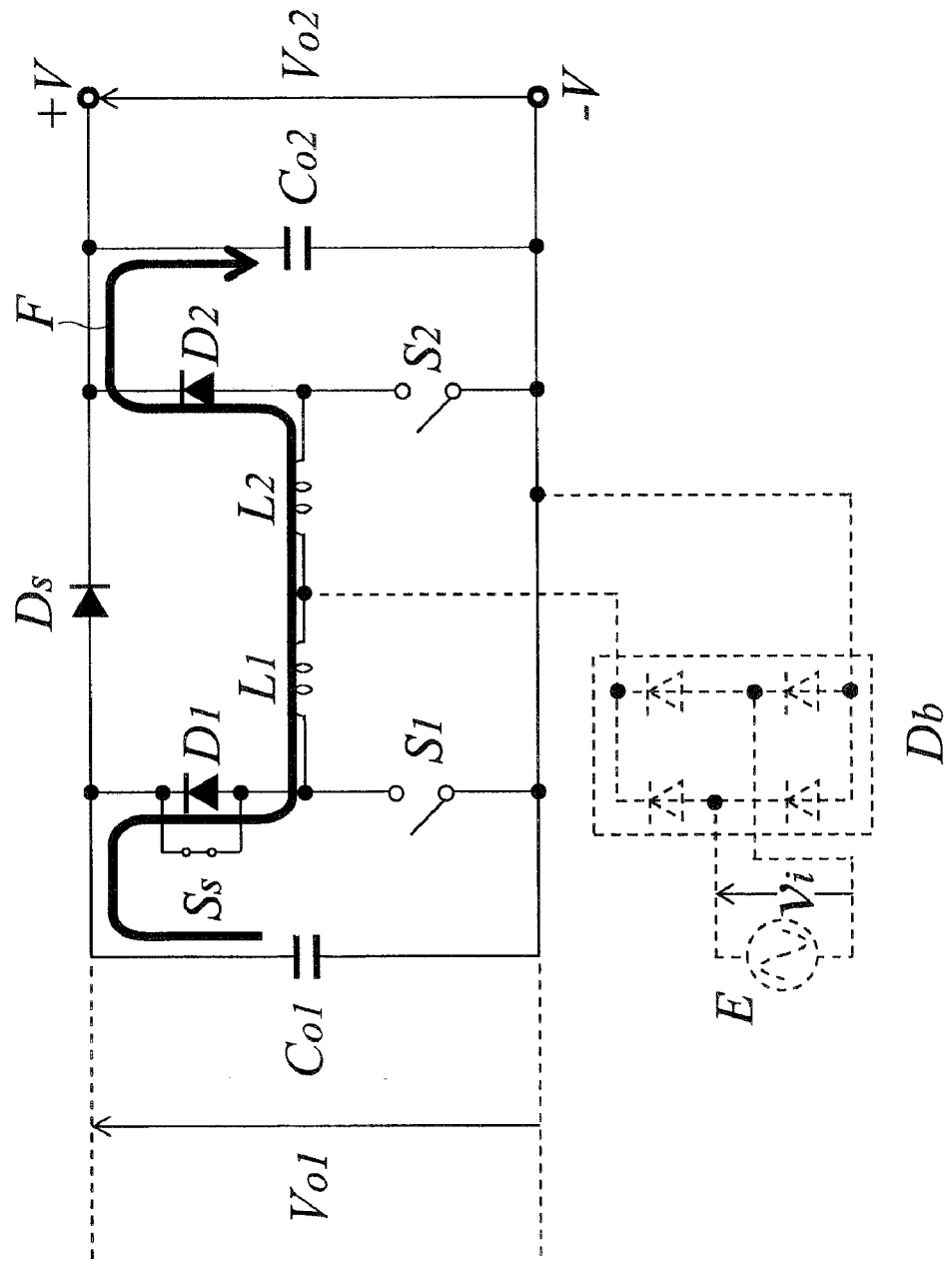
FIG. 3 is an explanatory diagram showing an equivalent circuit of the circuit in FIG. 1 in the event of a power failure or instantaneous power failure.

After a while, when the switching element S2 is set to OFF, then as shown in FIG. 3, the smoothing capacitors Co1, Co2 and the inductors L1, L2 are coupled through the switch element Ss and the rectification element D2 to form a closed circuit, and current flows as indicated by an arrow F, discharging energy stored in the inductors L1, L2 to the smoothing capacitor Co2. This generates the output voltage Vo2 across the smoothing capacitor Co2 which is higher than the voltage Vo1 across the smoothing capacitor Co1. Then, the period during which the switching element S2 is ON starts again and the above-described operations are repeated.

As with existing boost converters, the output voltage Vo2 of the PFC converter in accordance with the invention is obtained as: $Vo2=Vo1/(1-D)$, where D ($=Ton/T$) is the duty ratio that is a ratio of Ton, i.e., the ON time-length relative to a period T, i.e., the switching period of the switching element S2. Accordingly, even if the voltage Vo1 of the input power supply E, i.e., the voltage across the smoothing capacitor Co1 drops due to a power failure or instantaneous power failure, the output voltage Vo2 can be kept constant by variably controlling, based on the monitoring result of the output voltage Vo2, the duty ratio D of the switching element S2, the switching of which is controlled. Thus, even in the event of a power failure or instantaneous power failure, the output voltage Vo2 of the PFC converter is stabilized, which facilitates designing a power supply circuit to be subsequently connected to the PFC converter.

When the commercial power supply E recovers from a power failure or instantaneous power failure to normal operation, and the predetermined input voltage Vi is generated between the AC input lines again, the monitoring and controlling section sets the switch Ss to OFF and causes the switching element S1 of the converter section PFC1 and the switching element S1 of the converter section PFC2 to perform switching operation again. At this time, the PFC converter operates similarly to the two-parallel boost PFC converter (converter sections PFC1, PFC2) to approximate the waveform and phase of the input current from the commercial power supply E to each of the converter sections PFC1, PFC2 to the input voltage Vi having a generally sinusoidal shape, thereby reducing harmonic distortion of the input current and correcting power factor.

However, immediately after the recovery of the commercial power supply E, the output voltage Vo1 of the smoothing capacitor Co1 remains low due to a power failure or instantaneous power failure, so the rectification element Ds is set to OFF to charge the smoothing capacitor Co1 through the converter section PFC1 until the output voltage Vo1 reaches a desired voltage. Therefore, during the charging period, the output voltage Vo2 is supplied from the smoothing capacitor Co2 to a load through the converter section PFC2, so the desired output voltage Vo2 can be supplied to the load while storing energy in the smoothing capacitor Co1 immediately after the recovery of the commercial power supply E. Then, when the output voltage Vo1 becomes higher than the output voltage Vo2, the rectification element Ds is set to ON, and energy moves from the smoothing capacitor Co1 to the smoothing capacitor Co2 through the rectification element Ds, and then the output voltage Vo2 generated across the smoothing capacitor Co2 is supplied to the load.

As described above, the PFC converter in accordance with this embodiment is configured as follows. Rectified voltage is input from the commercial power supply E as input power supply through, e.g., a diode bridge Db. The PFC converter includes the converter sections PFC1, PFC2 connected in parallel to each other, the smoothing capacitor Co1 as the first capacitor connected between the output terminals of the converter section PFC1, and the smoothing capacitor Co2 as the second capacitor connected between the output terminals of the converter section PFC2. When the commercial power supply E operates normally, both the first and the second converter sections PFC1, PFC2 are caused to operate, and energy from the commercial power supply E is transmitted from the converter sections PFC1, PFC2 to the smoothing capacitors Co1, Co2, respectively, and then the stabilized output voltages Vo1, Vo2 are supplied from the smoothing capacitors Co1, Co2 to the load. And when the voltage of the commercial power supply E drops due to a power failure or instantaneous power failure, only the converter section PFC2 is switched, and energy from the smoothing capacitor Co1 is transmitted from the converter sections PFC1, PFC2 to the smoothing capacitor Co2, and then the stabilized output voltage Vo2 is supplied from the smoothing capacitor Co2 to the load.

With this configuration, when the commercial power supply E operates normally, the converter sections PFC1, PFC2 connected in parallel to each other can operate to approximate the input current from the commercial power supply E to the waveform and phase of the input voltage to correct power factor while supplying stabilized output voltages Vo1, Vo2 to the load. On the other hand, when the voltage of the commercial power supply E drops, the converter section PFC2 is caused to operate using the smoothing capacitor Co1 as the input power supply, which allows the smoothing capacitor Co2 to supply the stabilized output voltage Vo2 to the load. Therefore, when a power failure or instantaneous power failure occurs in the commercial power supply E, the PFC converter itself will have the functionality of preventing the output voltage Vo2 from dropping, so that the smoothing capacitors included in the PFC converter can be small in size and the power supply circuit can, for example, be simple, efficient, low-cost, small in size and lightweight.

Also, the PFC converter in accordance with this embodiment is configured as follows. The converter section PFC1 is configured such that a series circuit of the first inductor L1 and the first switching element S1 is connected between the input terminals of the converter section PFC1, and a series circuit of the switching element S1 and the first rectification element D1 is connected across the smoothing capacitor Co1. The converter section PFC2 is configured such that the series circuit of the second inductor L2 and the second switching element S2 is connected between the input terminals of the converter section PFC2, and the series circuit of the switching element S2 and the second rectification element D2 is connected across the smoothing capacitor Co2. The switch Ss as a first switch is connected in parallel to the rectification element D1. When the commercial power supply E operates normally, the switch Ss is set to OFF and the switching elements S1, S2 are caused to perform switching operation. And when the voltage of the commercial power supply E drops, the switch Ss is set to ON and the switching element S2 is caused to perform switching operation.

With this configuration, when the voltage of the commercial power supply E drops, by simply setting the switch Ss to ON to allow current to flow from the smoothing capacitor Co1 to the inductors L1, L2 and by simply causing the switching element S2 of the converter section PFC2 to perform switching operation, it becomes possible to transmit energy from each of the inductors L1, L2 to the capacitor Co2 to thereby supply the stabilized output voltage Vo2 to the load.

Although the switch Ss is used as a first switch in this embodiment, a switching element as in an embodiment described later may also be used.

Second Embodiment

Figure 4:
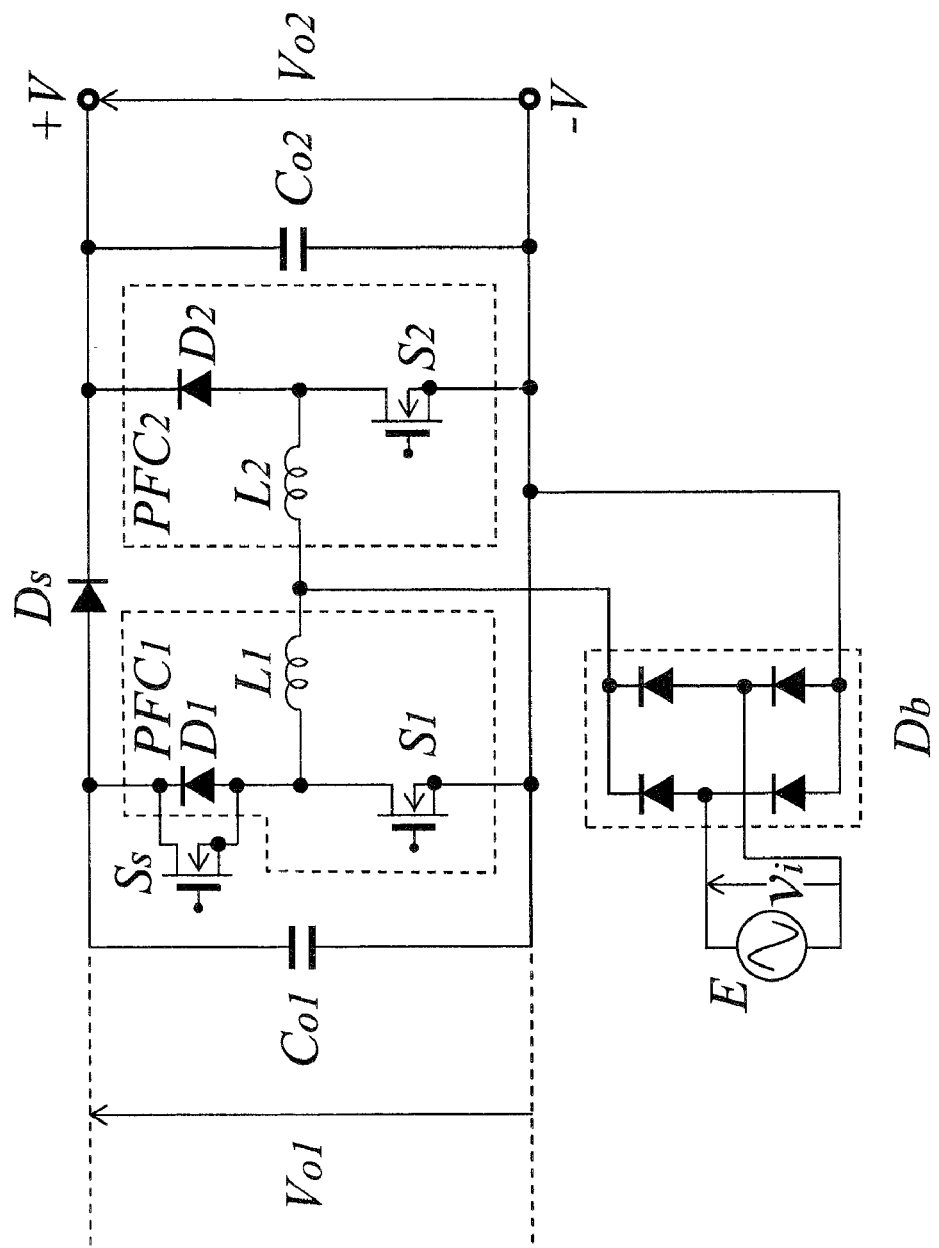
FIG. 4 is a circuit diagram showing a PFC converter in accordance with a second embodiment of the invention.

FIG. 4 shows a PFC converter in accordance with a second embodiment of the invention. In this embodiment, a semiconductor switching element, such as an FET, that can be set to ON or OFF at high speed is used for the switch Ss in place of the mechanical-type switch used in the first embodiment. The rest of the configuration, including a control circuit not shown, is the same as that of the first embodiment.

When neither power failure nor instantaneous power failure occurs in the commercial power supply E and a predetermined input voltage Vi is generated between the AC input line terminals, the monitoring and controlling section sets the switching element Ss to OFF and the converter sections PFC1, PFC2 are controlled by the control circuit so that the PFC converter will operate in the same way as the one shown in FIG. 1. Note that a body diode integrated in the switching element Ss may be used for the rectification element D1 which is a diode. When the output voltage Vo2 is higher than the output voltage Vo1, the rectification element Ds is set to OFF, and the output voltage Vo2 is supplied to the load including a power supply circuit and various electronic devices connected between the output terminals +V, −V. On the other hand, when the output voltage Vo1 is higher than the output voltage Vo2, the rectification element Ds is set to ON, and energy moves from the smoothing capacitor Co1 to the smoothing capacitor Co2 through the rectification element Ds, and then the output voltage Vo2 generated across the smoothing capacitor Co2 is supplied to the load.

Figure 5:
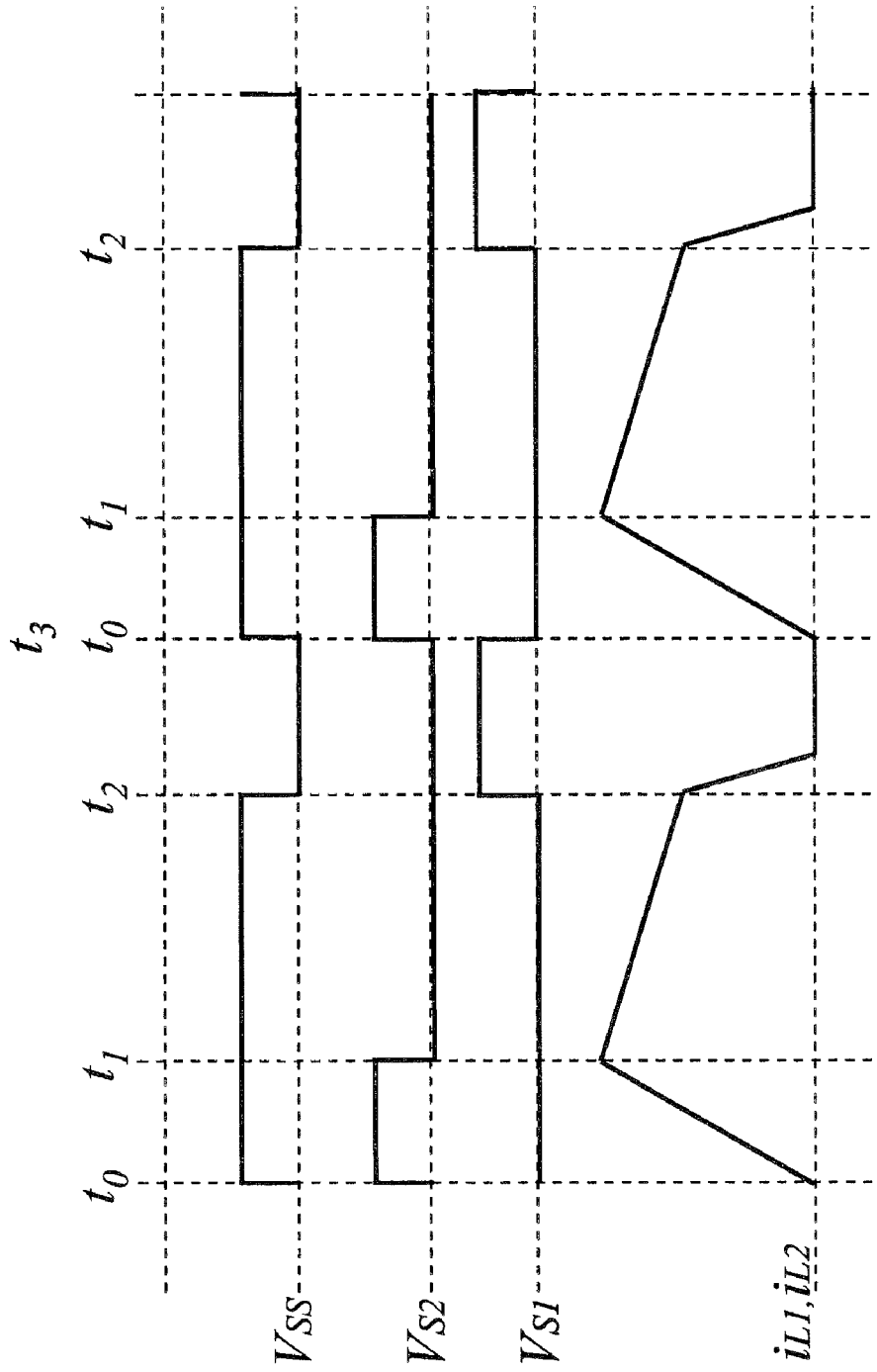
FIG. 5 shows the waveforms of various voltages and currents taken from the circuit in FIG. 4.
Figure 6:
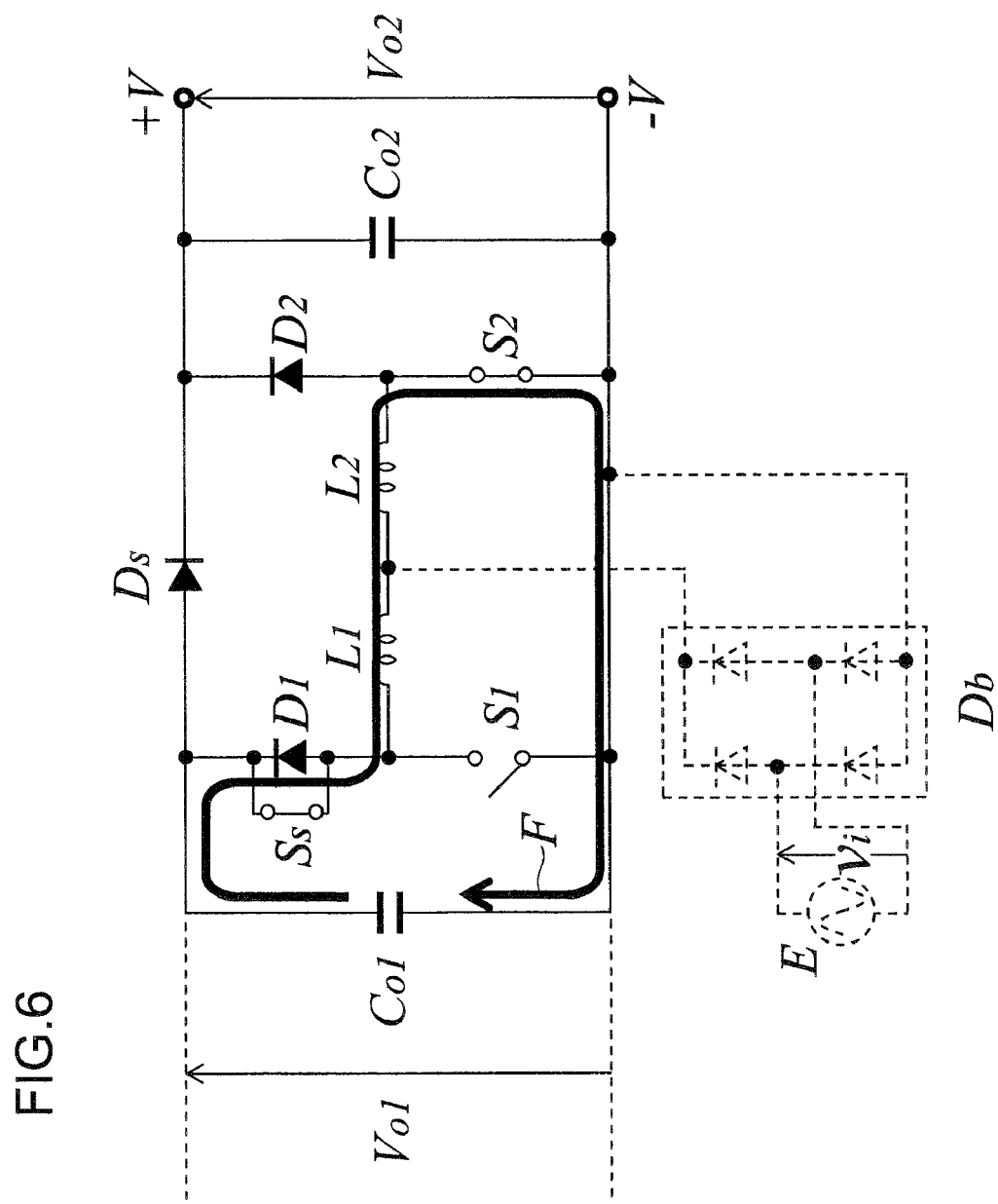
FIG. 6 is an explanatory diagram showing an equivalent circuit of the circuit in FIG. 4 in the period from t0 to t1 in the event of a power failure or instantaneous power failure.
Figure 7:
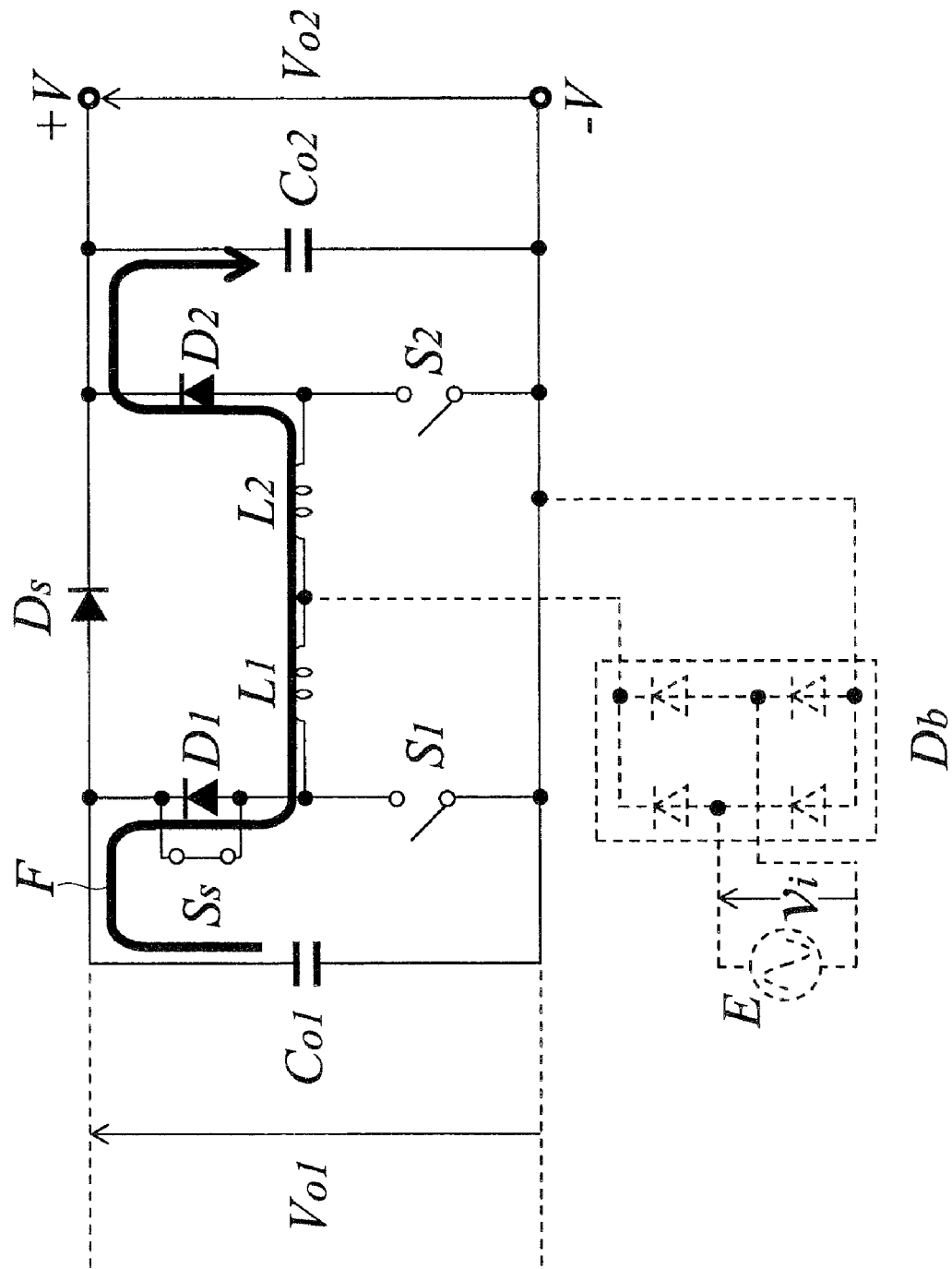
FIG. 7 is an explanatory diagram showing an equivalent circuit of the circuit in FIG. 4 in the period from t1 to t2 in the event of a power failure or instantaneous power failure.
Figure 8:
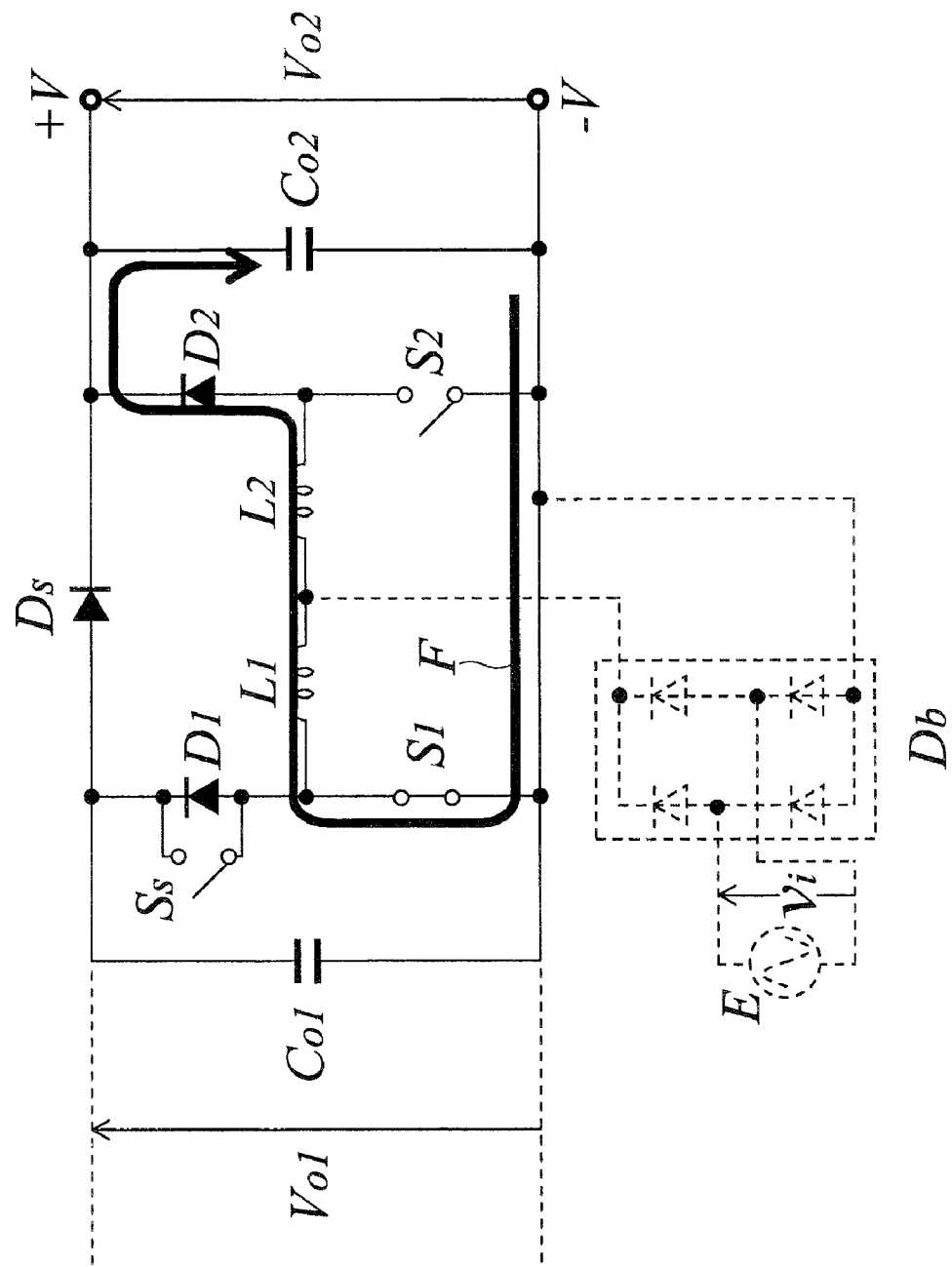
FIG. 8 is an explanatory diagram showing an equivalent circuit of the circuit in FIG. 4 in the period from t2 to t3 in the event of a power failure or instantaneous power failure.

On the other hand, FIG. 5 shows the waveforms of gate voltages Vss, Vs2, Vs1 of the switching elements Ss, S2, S1, respectively, and the waveforms of currents iL1, iL2 in the inductors L1, L2, respectively, in the event of a power failure or instantaneous power failure. In FIG. 5, t0, t1, t2 and t3 indicate the timing of state changes. FIGS. 6-8 show equivalent circuits of the individual states.

First, in the period from t0 to t1, as shown in FIG. 6, the switching elements Ss, S2 are set to ON and the switching element S1 is set to OFF, then, the smoothing capacitor Co1 and the inductors L1, L2 are coupled to form a closed circuit, and current flows as indicated by an arrow F, storing energy from the smoothing capacitor Co1 in the inductors L1, L2. At this time, the rectification element D2 is in an OFF state and a voltage generated across the smoothing capacitor Co2 appears between the output terminals +V, −V as the output voltage Vo2.

Next, in the period from t1 to t2, as shown in FIG. 7, when the switching element S2 is set to OFF, the smoothing capacitors Co1, Co2 and the inductors L1, L2 are coupled by the switching element Ss and the rectification element D2 which are in an ON state to form a closed circuit, and current flows as indicated by an arrow F, which discharges energy stored in the inductors L1, L2 to the smoothing capacitor Co2. This generates the output voltage Vo2 across the smoothing capacitor Co2 which is higher than the voltage Vo1 across the smoothing capacitor Co1.

Next, in the period from t2 to t3 (=t0), as shown in FIG. 8, the switching element Ss is set to OFF and the switching element S1 is set to ON. Then, the smoothing capacitor Co2 and the inductors L1, L2 are coupled by the switching element S1 and the rectification element D2 which are in an ON state to form a closed circuit, which discharges energy stored in the inductors L1, L2 to the smoothing capacitor Co2. Completely discharging energy from the inductors L1, L2 to reduce the inductor currents iL1, iL2 to zero within this period can achieve zero-current switching, that is, can turn the switching element S1 and the rectification element D2 OFF and the switching element S2 to ON with no current flow at the moment of to, thereby suppressing the switching loss and surge voltage of the switching elements S1, S2 and rectification element D2.

And then, the first period from t0 to t1 starts again and the above-described operations are repeated.

Again, in the event of a power failure or instantaneous power failure, the output voltage Vo2 generated across the smoothing capacitor Co2 can be kept constant by performing the above-described series of operations while controlling the duty ratio D of the switching element S2. This stabilizes the output voltage Vo2 of the PFC converter, facilitating designing a power supply circuit to be subsequently connected to the PFC converter.

The PFC converter in accordance with this embodiment is configured as follows. A third switching element Ss body in place of the switch Ss in the first embodiment is used to constitute the first open/close. When the commercial power supply E operates normally, the switching element Ss is set to OFF and the switching elements S1, S2 are caused to perform switching operation. When the voltage of the commercial power supply E drops, the switching element Ss is set to ON and the switching element S2 is caused to perform switching operation so that energy from the smoothing capacitor Co1 will be transmitted from the converter sections PFC1, PFC2 to the smoothing capacitor Co2, and the stabilized output voltage Vo2 will be supplied from the smoothing capacitor Co2 to the load. And during the period from the time the switching element S2 is set to OFF until the time the switching element S2 is set to ON, the switching element S1 is temporarily set to ON and the switching element Ss is temporarily set to OFF so that energy stored in the inductors L1, L2 will be completely discharged to the smoothing capacitor Co2 by setting the switching element S2 to OFF.

With this configuration, with inductor currents iL1, iL2 flowing from the inductors L1, L2 to the smoothing capacitor Co2 reduced to zero, the switching element S1 and the rectification element D2 can be turned OFF, which suppresses the switching loss and surge voltage of the switching element S1 and rectification element D2.

Third Embodiment

Figure 9:
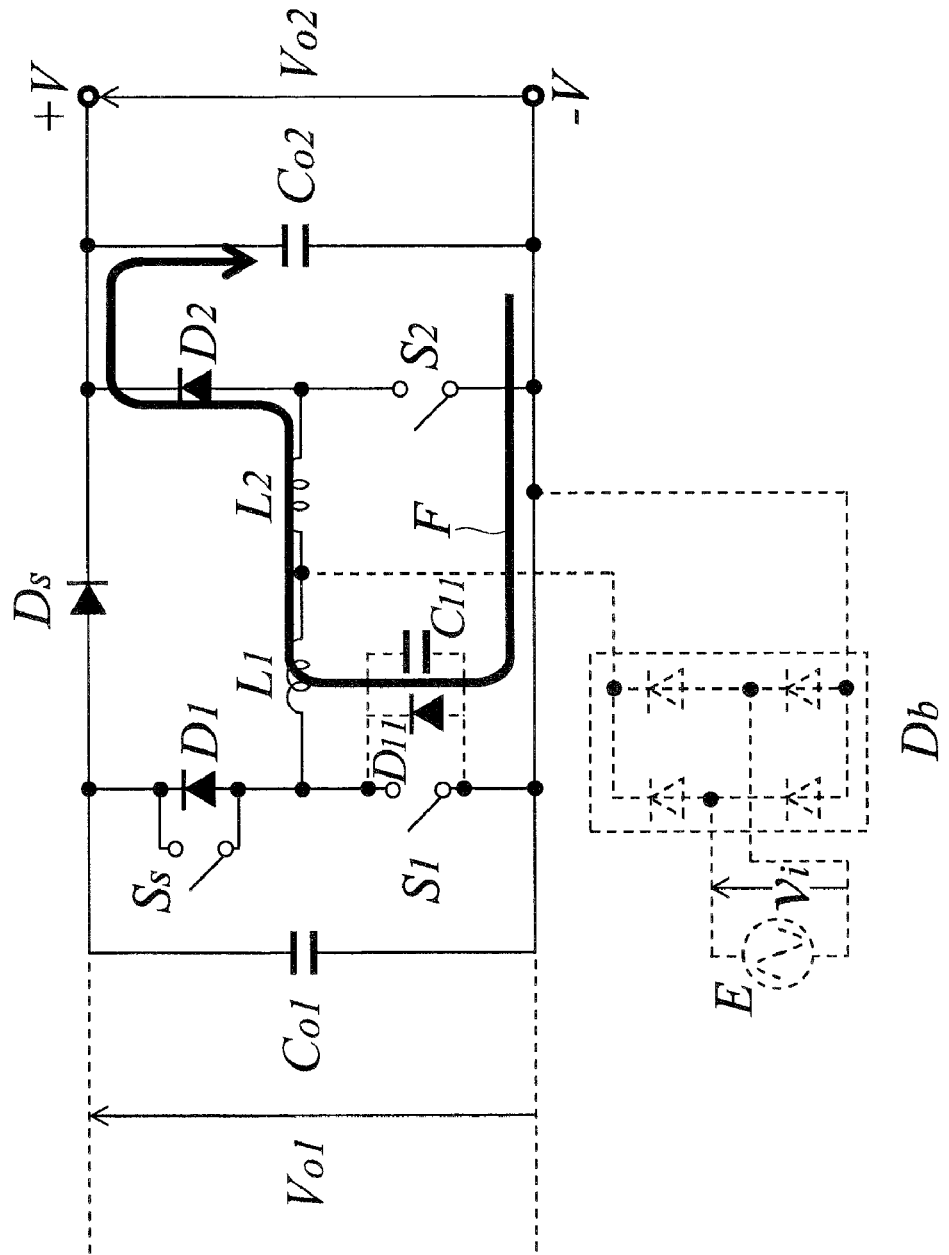
FIG. 9 is a circuit diagram showing one operating state of a PFC converter in accordance with a third embodiment of the invention.

FIG. 9 shows one operating state of a PFC converter in accordance with a third embodiment of the invention. In this embodiment, the above-described monitoring and controlling section of the control circuit is configured such that, in the circuit shown in FIG. 4 in accordance with the second embodiment, a dead time that is a period during which both the switching element Ss and the switching element S1 are set to OFF as shown in FIG. 9 is provided between the operations shown in FIGS. 7 and 8. The rest of the configuration and operation is the same as that of the second embodiment, however, the first switching element S1 is preferably an FET with the body diode D11 connected in anti-parallel between the drain and source. Of course, a switching element other than such an FET, with a similar rectification element externally connected, may also be used for the switching element S1. Note that C11 shown is parasitic capacitance between the drain and source of the switching element S1.

In the PFC converter in accordance with this embodiment, in the period shown in FIG. 9, since the switching elements S1, S2, Ss are all OFF, energy stored in the capacitance C11 between the drain and source of the switching element S1 is discharged by the inductor currents iL1, iL2 flowing from the rectification element D2 to the smoothing capacitor Co2. After the capacitance C11 is completely discharged and the voltage between the drain and source of the switching element S1 is reduced to zero, the inductor currents iL1, iL2 continue to flow through the body diode D11 of the switching element S1. Therefore, by configuring the setting-ON timing of the switching element S1 such that the switching element S1 is set to ON during this state, zero-voltage switching can be achieved, that is, the switching element S1 can be turned ON with zero voltage between the drain and source, which suppresses the switching loss and surge voltage of the switching element S1.

As described above, the PFC converter in accordance with this embodiment is configured such that, in addition to the configuration of the second embodiment, when the voltage of the commercial power supply E drops, a period during which both the switching elements S1 and Ss of the converter section PFC1 are set to OFF is provided so that energy stored across the switching elements S1 will be completely discharged before the switching elements S1 is set to ON.

With this configuration, with the voltage between the drain and source of the switching element S1 reduced to zero, the switching element S1 can be turned ON, which suppresses the switching loss and surge voltage of the switching element S1.

Fourth Embodiment

Figure 10:
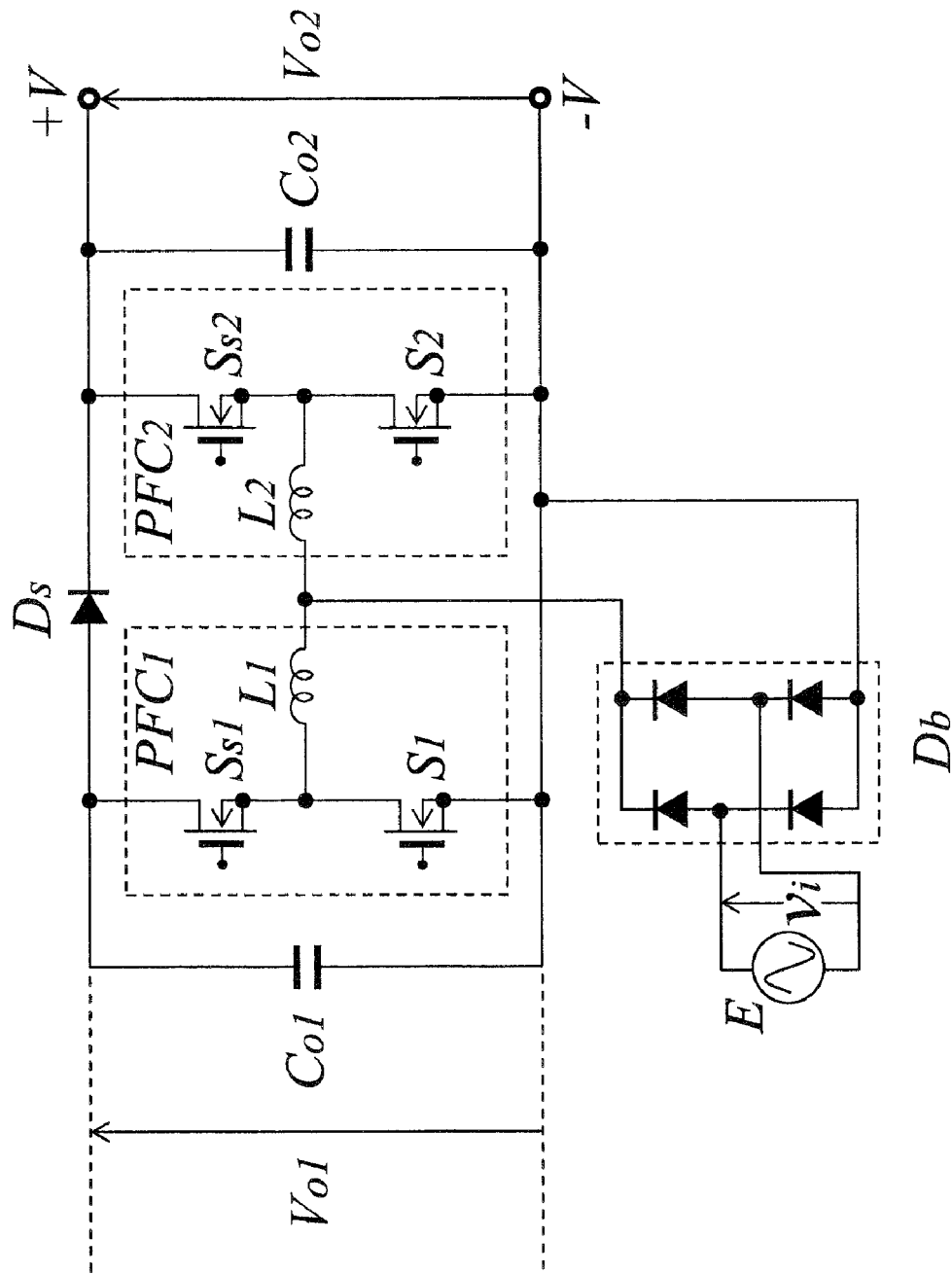
FIG. 10 is a circuit diagram of a PFC converter in accordance with a fourth embodiment of the invention.

FIG. 10 shows a PFC converter in accordance with a fourth embodiment of the invention, in which switching elements Ss1, Ss2 such as FETs can be used in place of the rectification elements D1, D2. In other words, in the fourth embodiment, the switching element Ss2 is used in place of the rectification element D2 in the second embodiment shown in FIG. 4.

When neither power failure nor instantaneous power failure occurs in the commercial power supply E, the monitoring and controlling section sets both the switching elements Ss1 and Ss2 to OFF, and body diodes (not shown) of the switching elements Ss1, Ss2 are used in place of the rectification elements D1, D2. Alternatively, the switching elements Ss1, Ss2 may be caused to operate as synchronous-rectifier switch. In this case, in the first converter section PFC1, when the switching element S1 is ON, the switching element Ss1 is set to OFF and energy is stored in the inductor L1, and when the switching element S1 is OFF, the switching element Ss1 is set to ON and energy stored in the inductor L1 is discharged to the smoothing capacitor Co1, which generates the output voltage Vo1 higher than the input voltage Vi. Similarly across the smoothing capacitor Co1, in the second converter section PFC2, when the switching element S2 is ON, the switching element Ss2 is set to OFF and energy is stored in the inductor L2, and when the switching element S1 is OFF, the switching element Ss2 is set to ON and energy stored in the inductor L2 is discharged to the smoothing capacitor Co2, which generates the smoothing capacitor Co2 the output voltage Vo2 higher than the input voltage Vi across.

As yet another example, separate rectification elements (not shown) may be attached in parallel to the switching elements Ss1, Ss2. With these circuit configurations, the PFC converter in accordance with this embodiment operates similarly to the circuit shown in FIG. 1 in accordance with the first embodiment.

Figure 11:
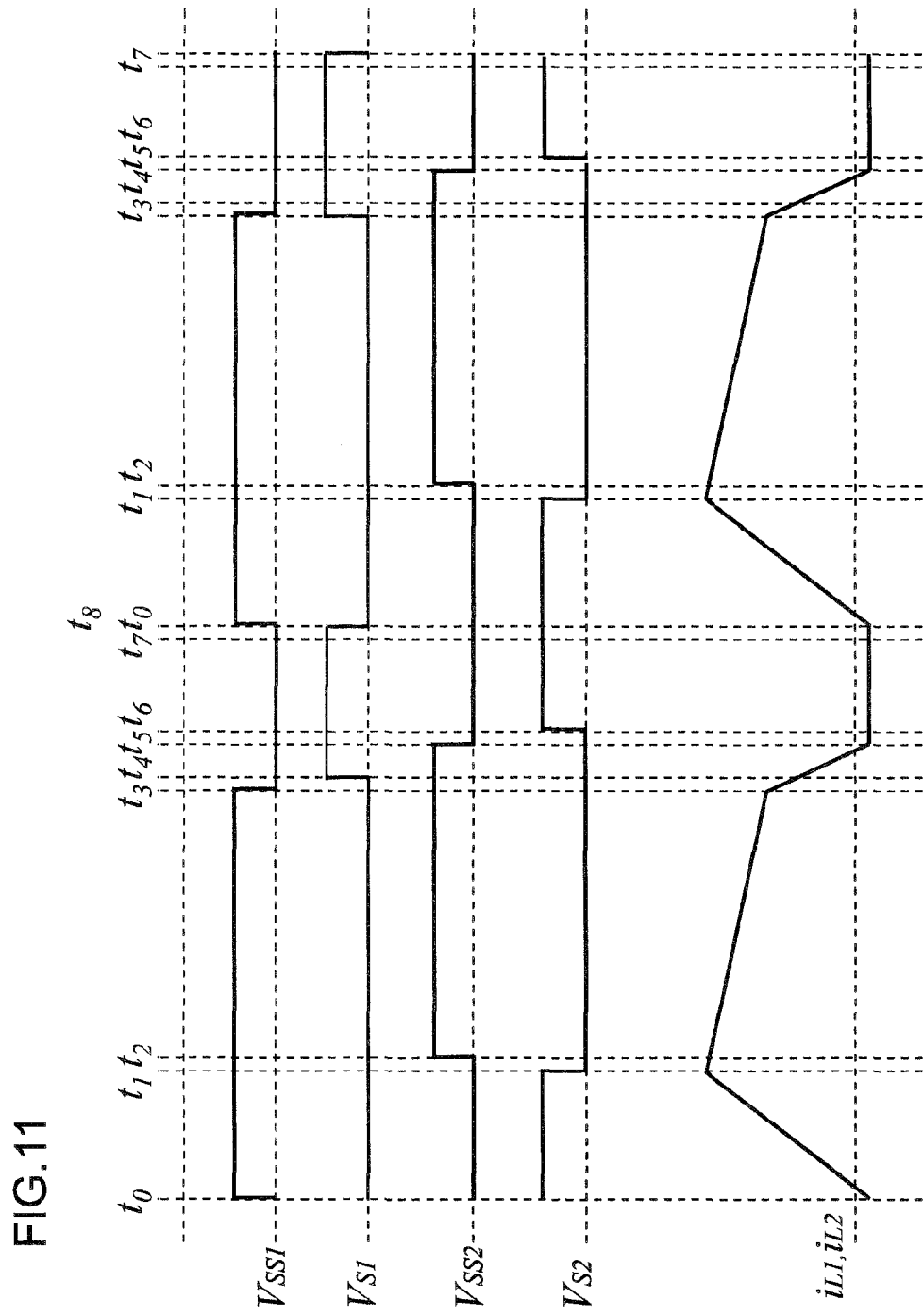
FIG. 11 shows the waveforms of various voltages and currents taken from the circuit in FIG. 10.

On the other hand, FIG. 11 shows the waveforms of gate voltages Vss1, Vs1, Vss2, Vs2 of the switching elements Ss1, S1, Ss2, S2, respectively, and the waveforms of currents iL1, iL2 of the inductors L1, L2, respectively, in the event of a power failure or instantaneous power failure. In FIG. 11, t0, t1, t2, t3, t4, t5, t6, t7 and t8 indicate the timing of state changes. FIGS. 12 to 21 show equivalent circuits of the individual states.

Figure 12:
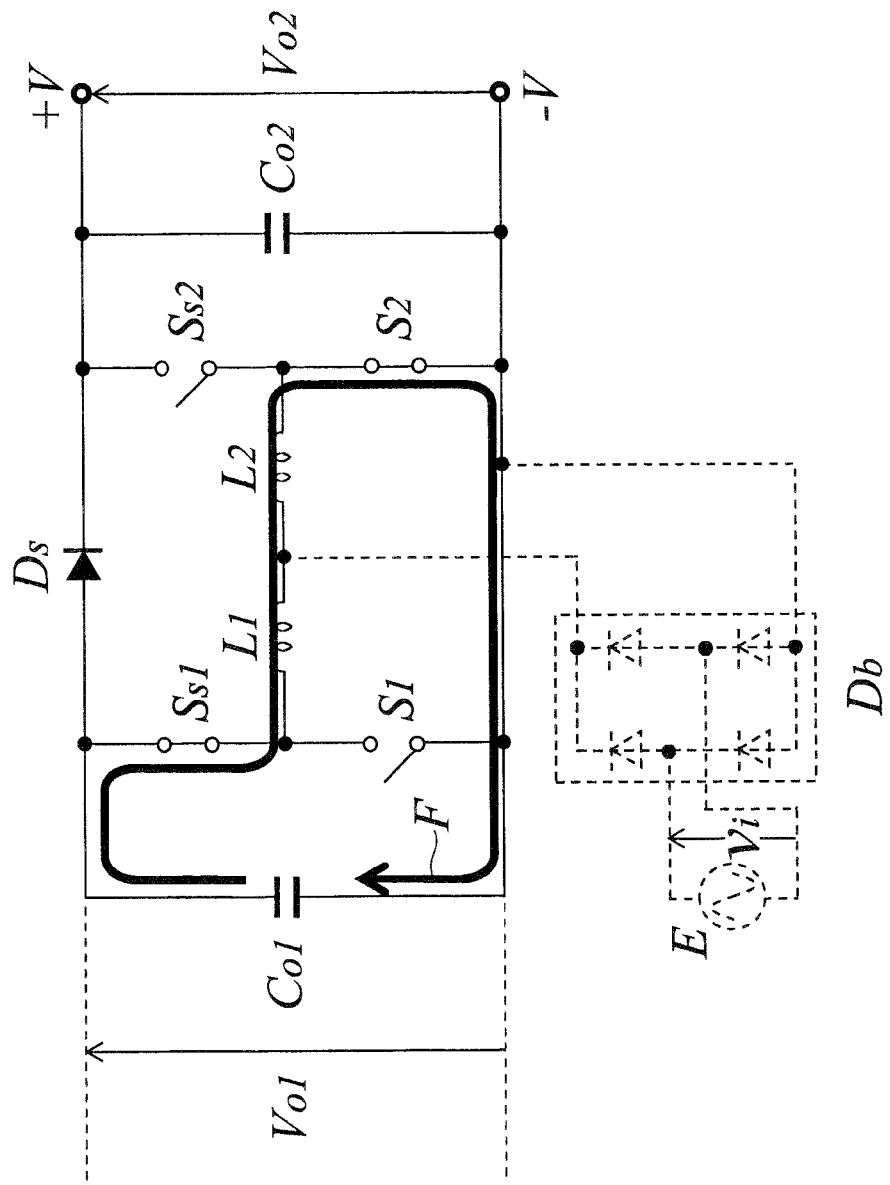
FIG. 12 is an explanatory diagram showing an equivalent circuit of the circuit in FIG. 10 in the period from t0 to t1 in the event of a power failure or instantaneous power failure.

First, in the period from t0 to t1, as shown in FIG. 12, the switching elements Ss1, S2 are set to ON and the switching elements S1, Ss2 are set to OFF, then, the smoothing capacitor Co1 and the inductors L1, L2 are coupled to form a closed circuit, and current flows as indicated by an arrow F, storing energy from the smoothing capacitor Co1 in the inductors L1, L2.

Figure 13:
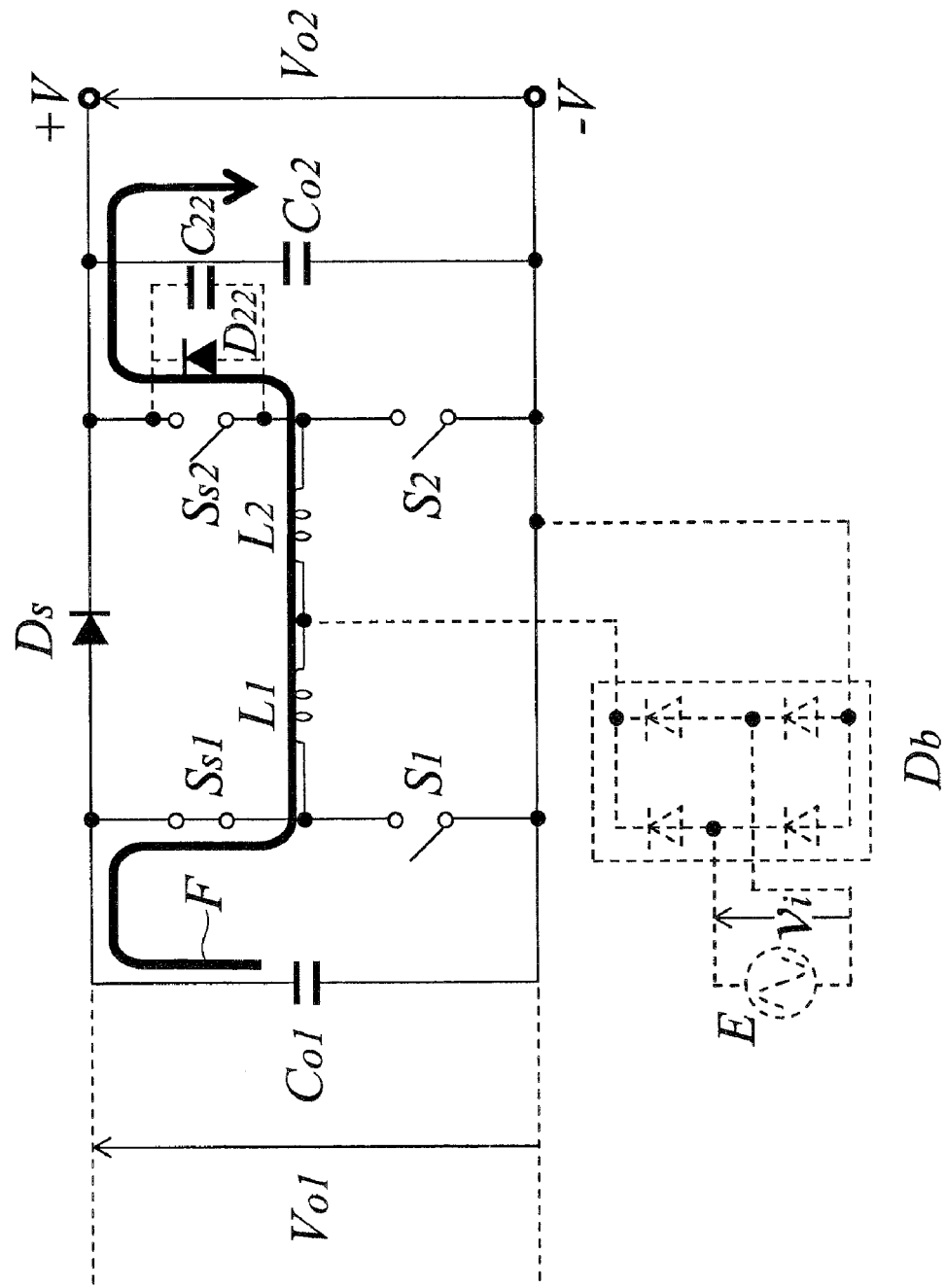
FIG. 13 is an explanatory diagram showing an equivalent circuit of the circuit in FIG. 10 in the period from t1 to t2 in the event of a power failure or instantaneous power failure.
Figure 14:
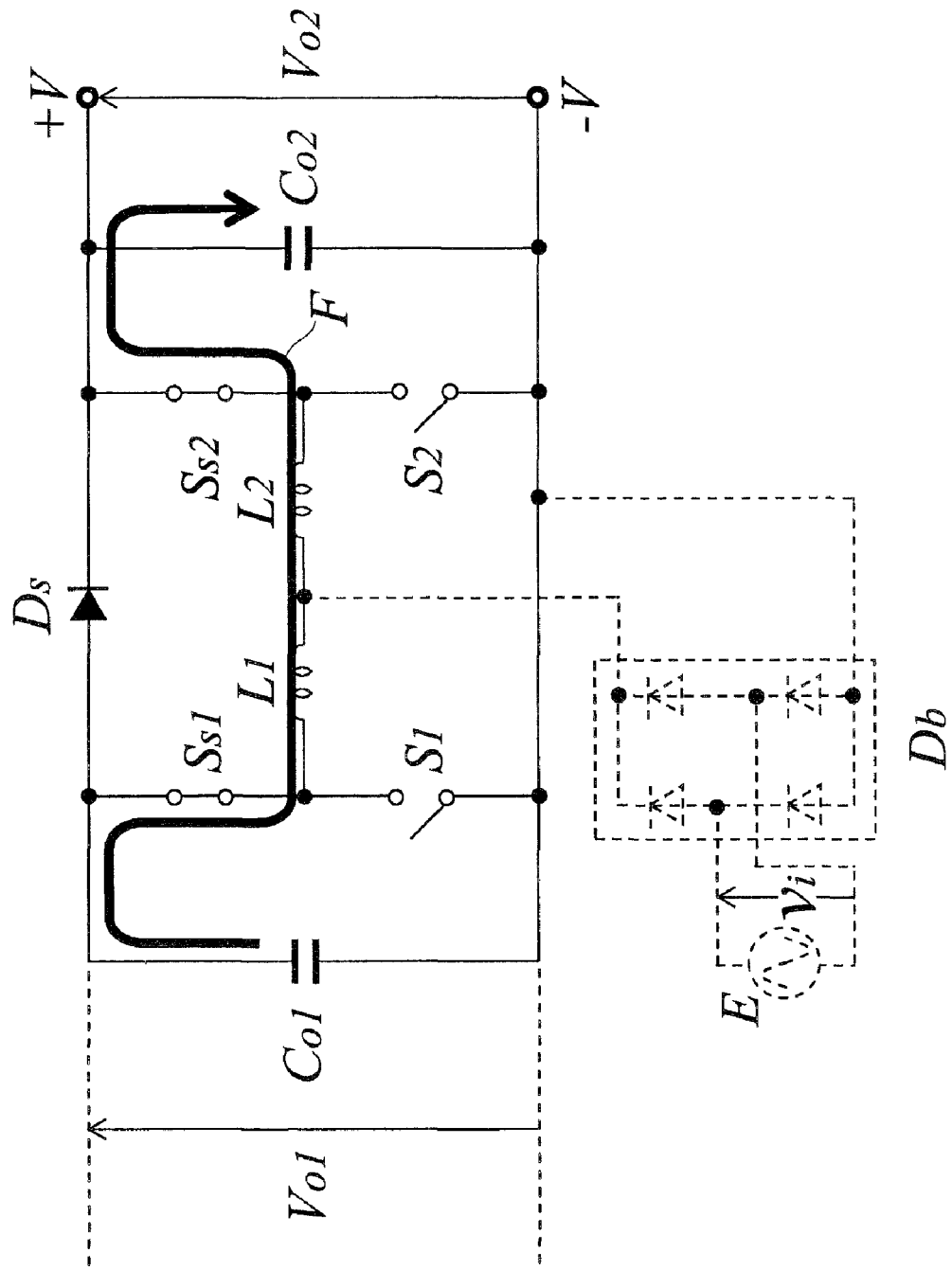
FIG. 14 is an explanatory diagram showing an equivalent circuit of the circuit in FIG. 10 in the period from t2 to t3 in the event of a power failure or instantaneous power failure.

Next, in the period from t1 to t2, as shown in FIG. 13, the switching element S2 is set to OFF. This causes energy stored in the capacitance C22 between the drain and source of the switching element Ss2 to be discharged by the inductor currents iL1, iL2 flowing from the smoothing capacitor Co1 to the inductors L1, L2. Thus, when the voltage between the drain and source is reduced to zero and the capacitance C22 is completely discharged, the inductor currents iL1, iL2 continue to flow through the body diode D22 integrated in the switching element Ss2. Then, with this state, setting the switching element Ss2 to ON to transition to the next period from t2 to t3 shown in FIG. 14 achieves zero-voltage switching of the switching element Ss2. Note that, in the period from t2 to t3, since the smoothing capacitors Co1, Co2 and the inductors L1, L2 are coupled to form a closed circuit, energy stored in the inductors L1, L2 and the smoothing capacitor Co1 is discharged to the smoothing capacitor Co2, and the output voltage Vo2 higher than the voltage Vo1 across the smoothing capacitor Co1 is generated across the smoothing capacitor Co2.

Figure 15:
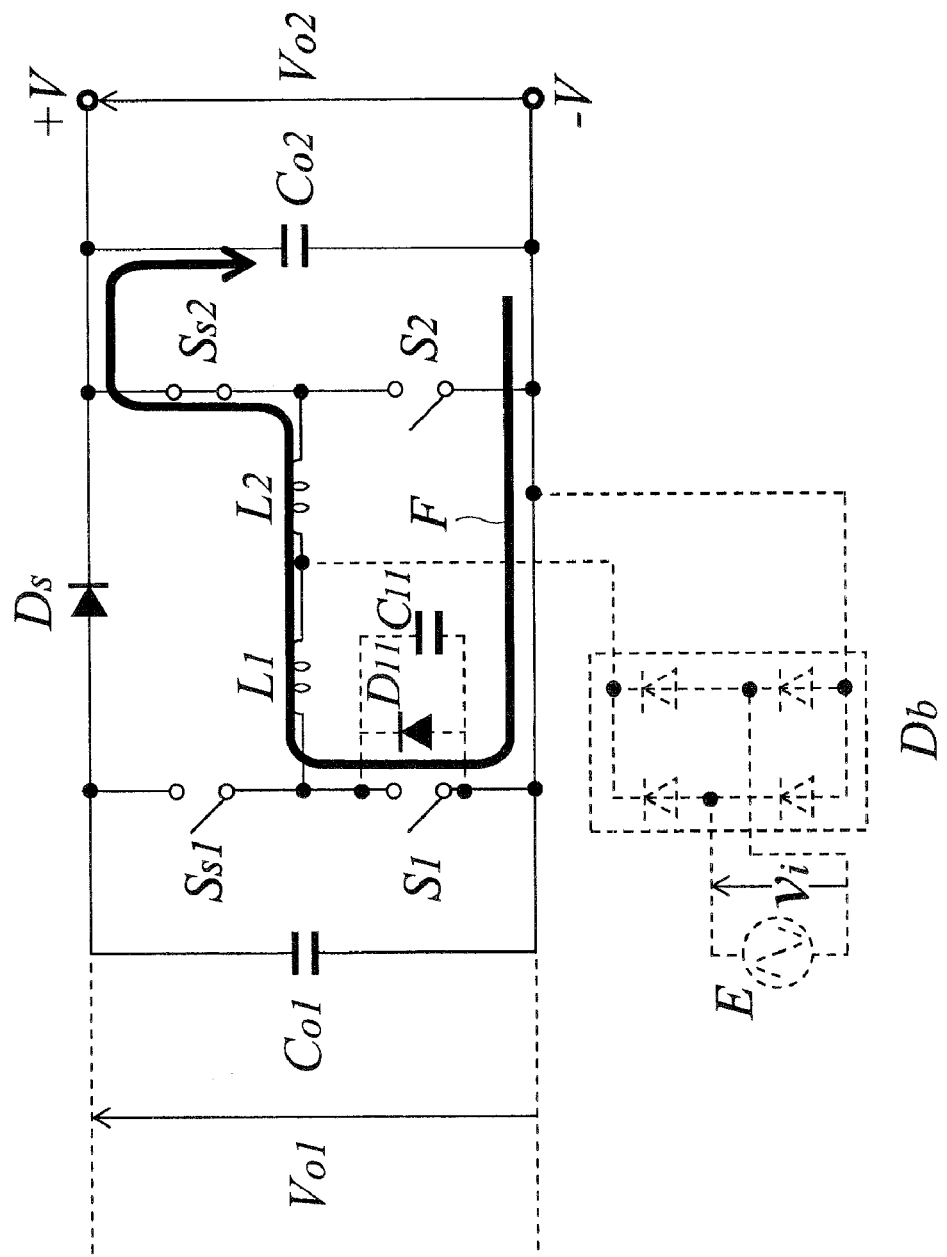
FIG. 15 is an explanatory diagram showing an equivalent circuit of the circuit in FIG. 10 in the period from t3 to t4 in the event of a power failure or instantaneous power failure.
Figure 16:
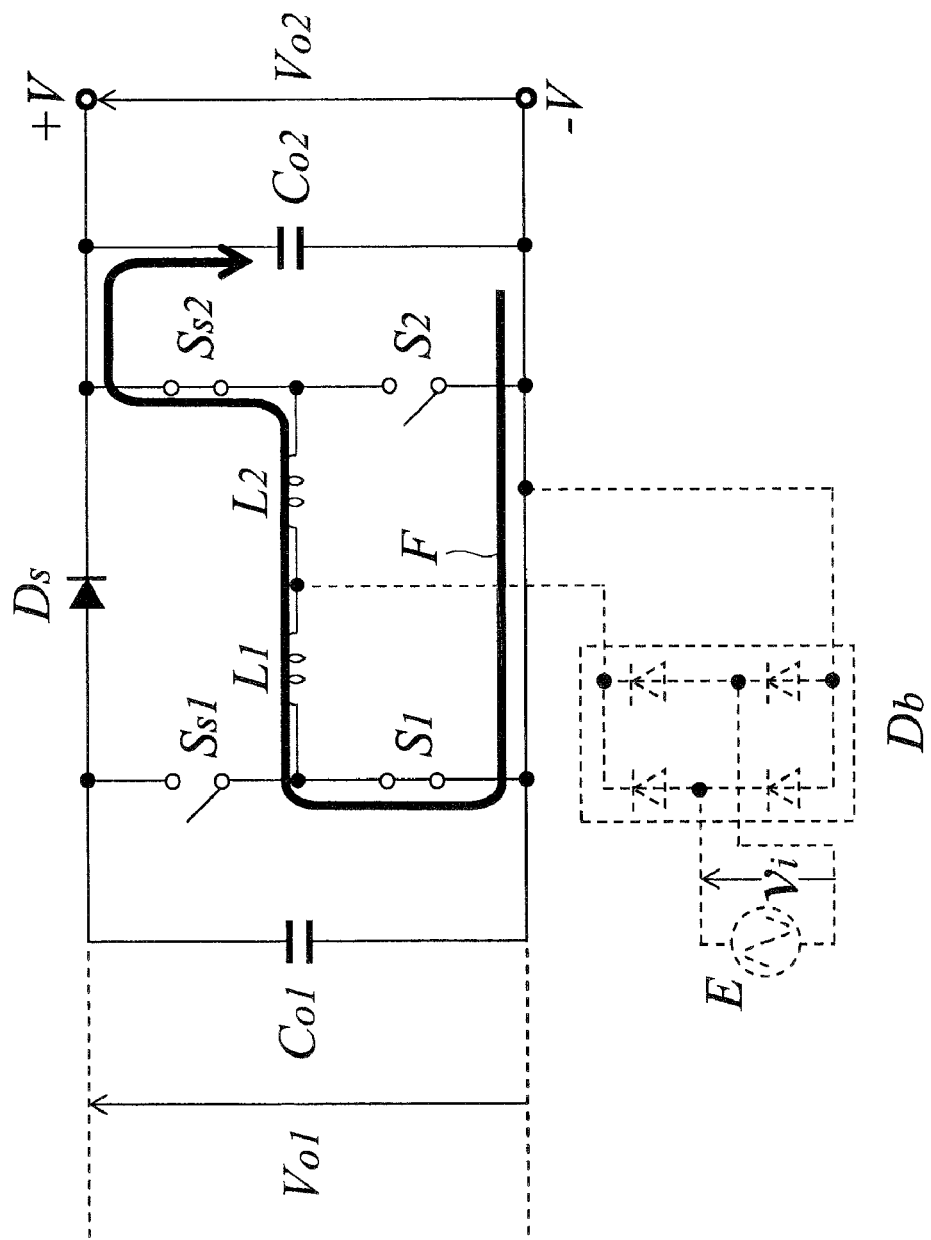
FIG. 16 is an explanatory diagram showing an equivalent circuit of the circuit in FIG. 10 in the period from t4 to t5 in the event of a power failure or instantaneous power failure.
Figure 17:
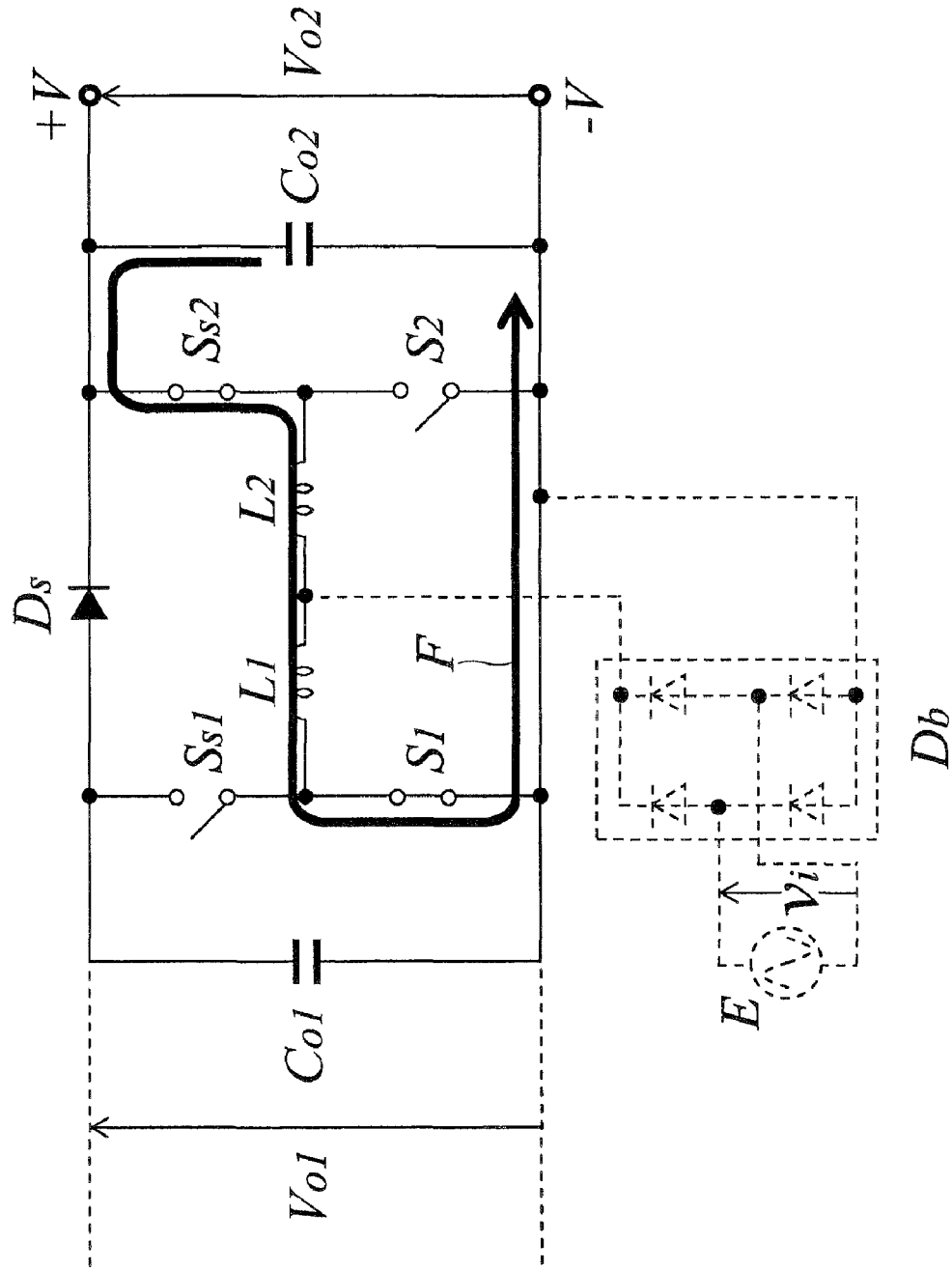
FIG. 17 is an explanatory diagram showing an equivalent circuit of the circuit in FIG. 10 in the period from t4 to t5 in the event of a power failure or instantaneous power failure.
Figure 18:
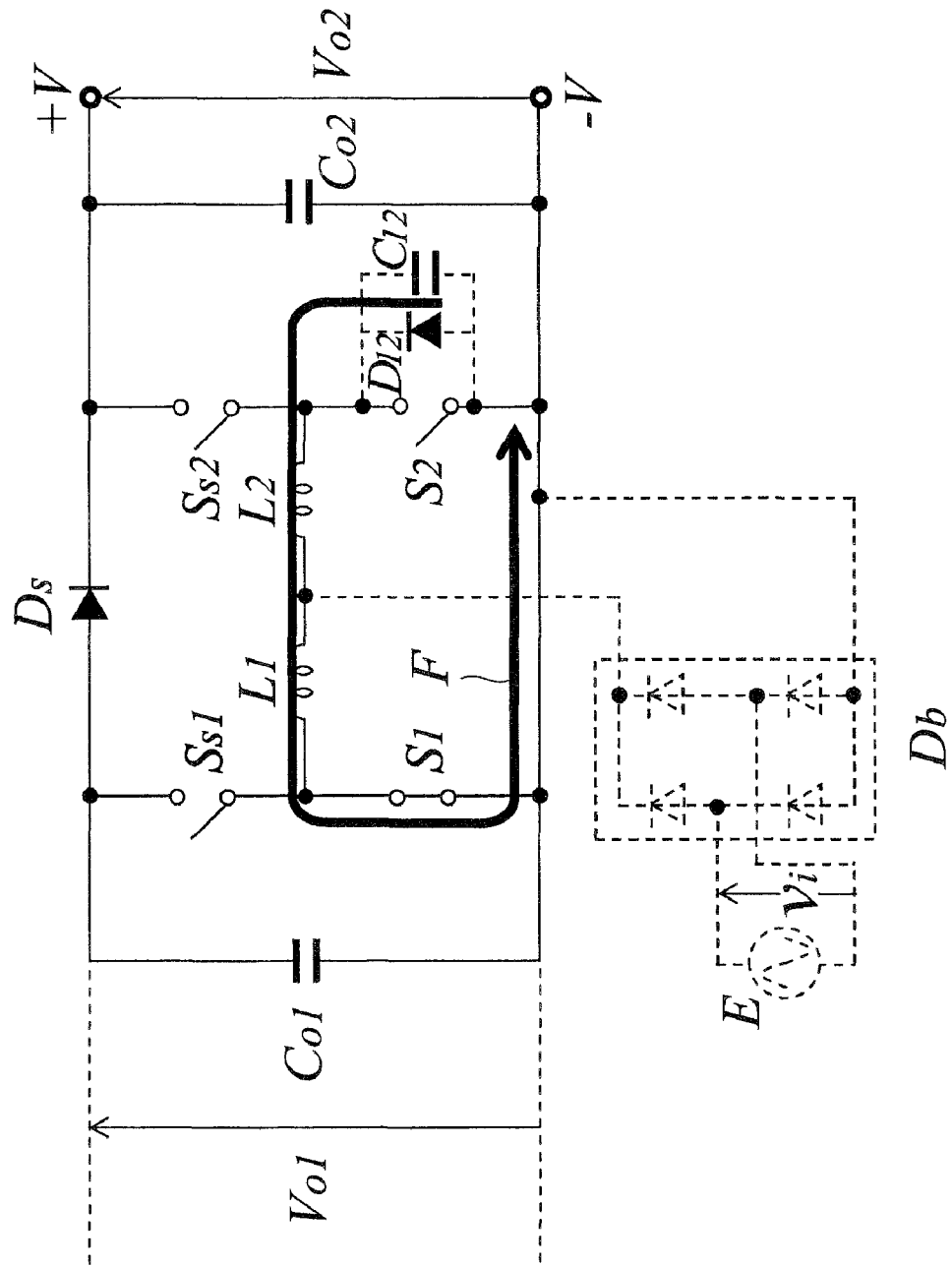
FIG. 18 is an explanatory diagram showing an equivalent circuit of the circuit in FIG. 10 in the period from t5 to t6 in the event of a power failure or instantaneous power failure.
Figure 19:
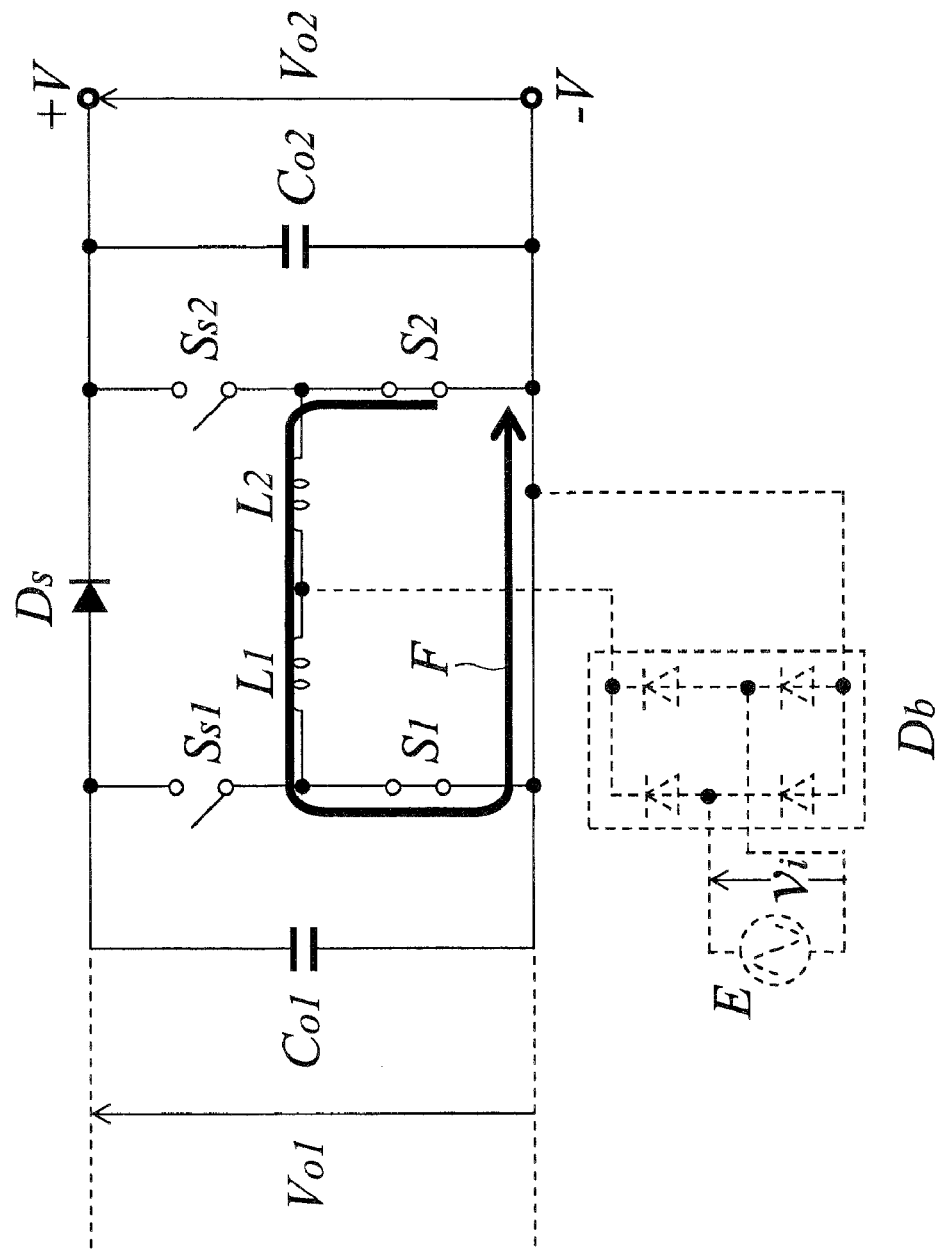
FIG. 19 is an explanatory diagram showing an equivalent circuit of the circuit in FIG. 10 in the period from t6 to t7 in the event of a power failure or instantaneous power failure.

Next, in the period from t3 to t4, as shown in FIG. 15, the switching element Ss1 is set to OFF, then energy stored in the capacitance C11 between the drain and source of the switching element S1 is discharged by the inductor currents iL1, iL2 flowing from the inductors L1, L2 to the smoothing capacitor Co2. Then, when the voltage between the drain and source is reduced to zero and the capacitance C11 is completely discharged, the inductor currents iL1, iL2 continue to flow through the body diode D11 integrated in the switching element S1. Thus, with this state, setting the switching element S1 to ON to transition to the next period from t4 to t5 shown in FIG. 16 achieves zero-voltage switching of the switching element S1. Also, in the period from t4 to t5, since the smoothing capacitor Co2 and the inductors L1, L2 are coupled to form a closed circuit, energy stored in the inductors L1, L2 is discharged to the smoothing capacitor Co2. This causes the inductor currents iL1, iL2 to decrease, and after a while, the inductor currents iL1, iL2 begin to flow in the reverse direction, as shown in FIG. 17. Then, in the next period from t5 to t6 shown in FIG. 18, setting the switching element Ss2 to OFF causes energy stored in the capacitance C12 between the drain and source of the switching element S2 to be discharged by the inductor currents iL1, iL2 flowing in the reverse direction. Then, when the voltage between the drain and source is reduced to zero and the capacitance C12 is completely discharged, the inductor currents iL1, iL2 continue to flow in the reverse direction through the body diode D12 integrated in the switching element S2. Then, when the voltage between the drain and source of the switching element S2 is reduced to zero, setting the switching element S2 to ON to transition to the period from t6 to t7 shown in FIG. 19 achieves zero-voltage switching of the switching element S2.

Figure 20:
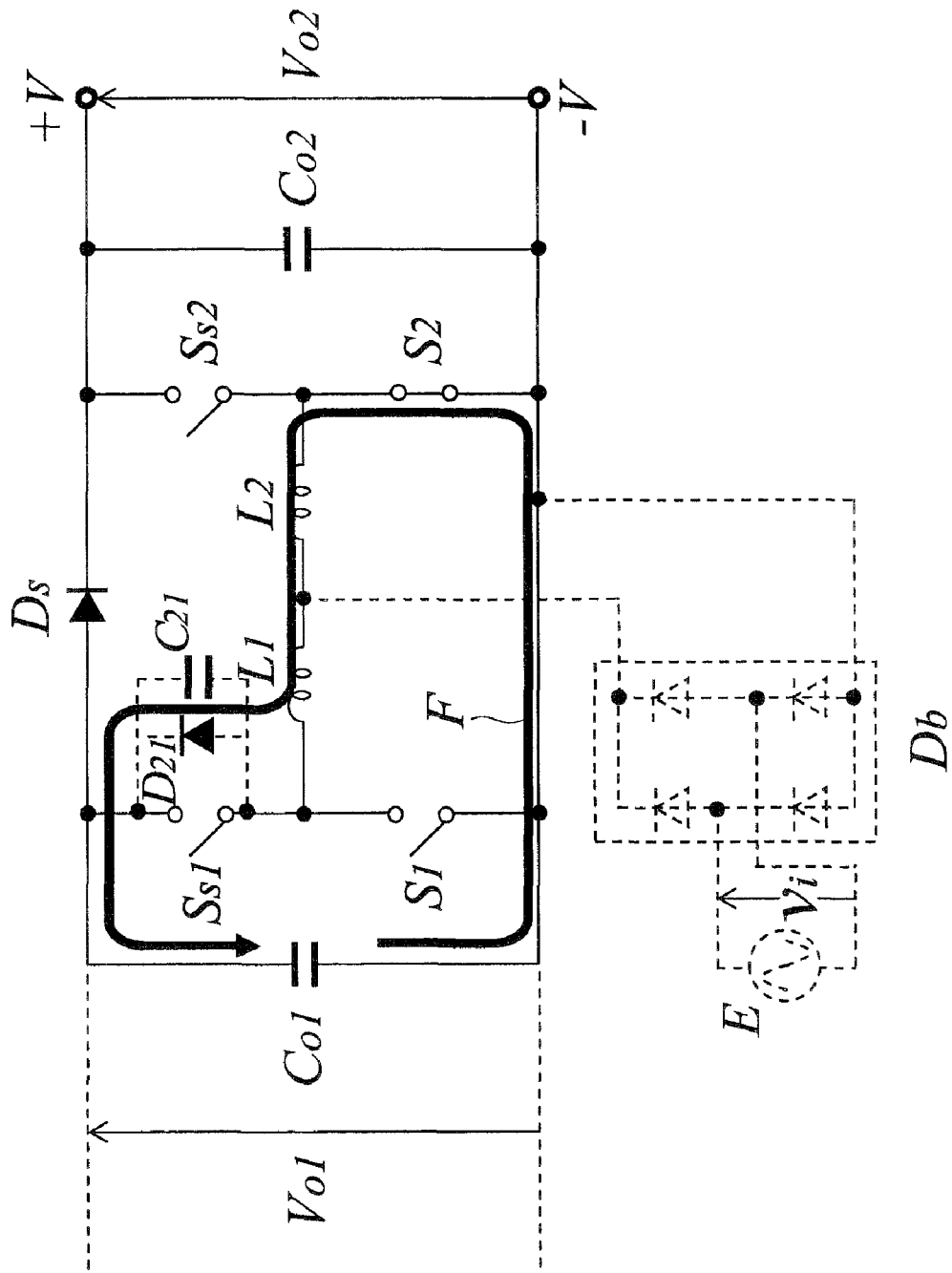
FIG. 20 is an explanatory diagram showing an equivalent circuit of the circuit in FIG. 10 in the period from t7 to t8 in the event of a power failure or instantaneous power failure.
Figure 21:
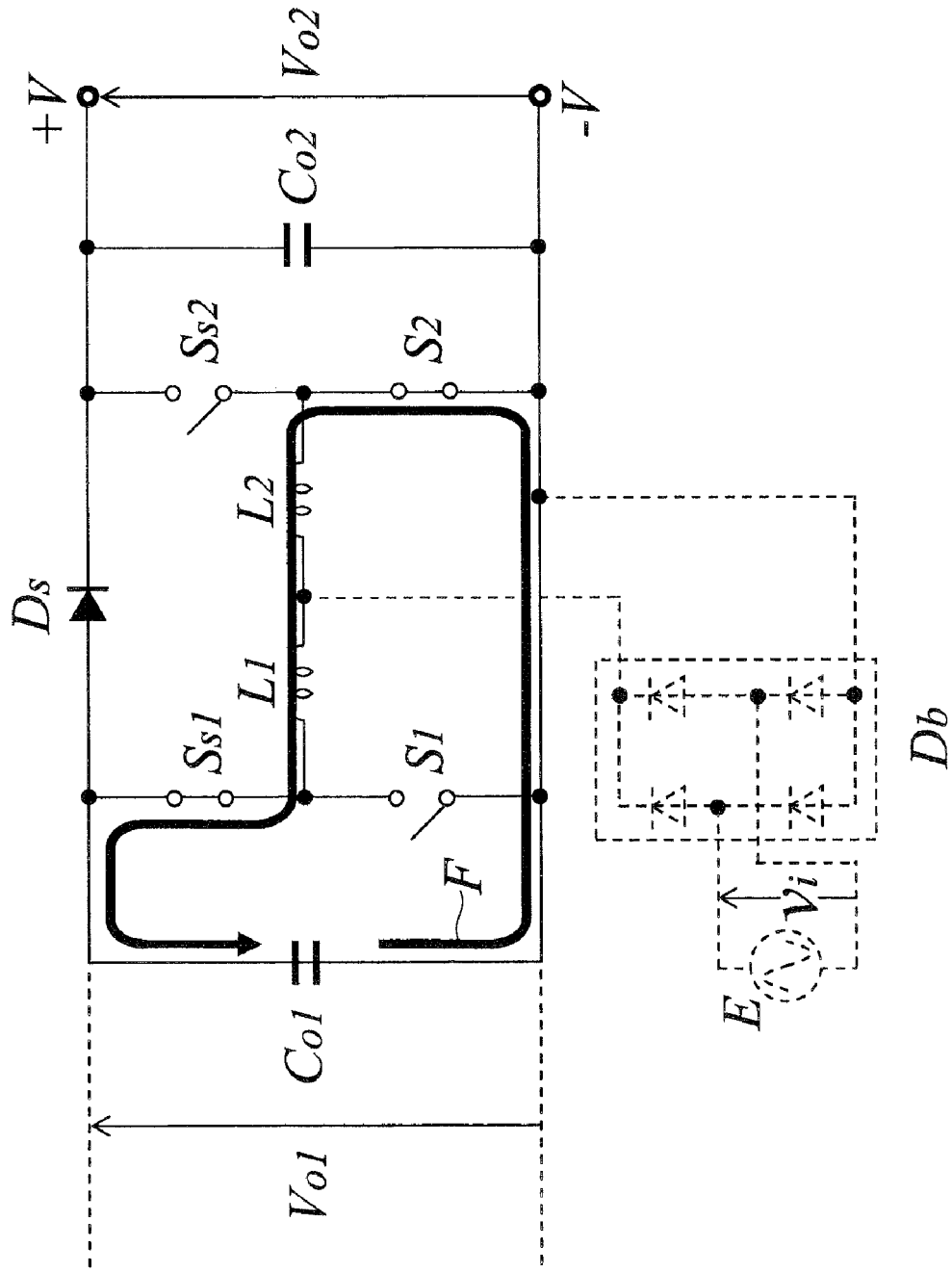
FIG. 21 is an explanatory diagram showing an equivalent circuit of the circuit in FIG. 10 in the period from t8 to t1 in the event of a power failure or instantaneous power failure.

Next, in the period from t7 to t8, as shown in FIG. 20, the switching element S1 is set to OFF, then energy stored in the capacitance C21 between the drain and source of the switching element Ss1 is discharged by the inductor currents iL1, iL2 flowing in the reverse direction, which reduces the voltage between the drain and source of the switching element Ss1 to zero. Then, when the capacitance C21 is completely discharged, the inductor currents iL1, iL2 continue to flow in the reverse direction through the body diode D21 integrated in the switching element Ss1. Thus, when the voltage between the drain and source of the switching element Ss1 is reduced to zero, setting the switching element Ss1 to ON to transition to the period from t8 (=t0) to t1 shown in FIG. 21 achieves zero-voltage switching of the switching element Ss1.

In the period from t8 to t1, since the smoothing capacitor Co1 and the inductors L1, L2 are coupled to form a closed circuit, energy stored in the inductors L1, L2 is discharged to the smoothing capacitor Co1. This causes the inductor currents iL1, iL2 in the reverse direction to decrease, and after a while, the state returns to that shown in FIG. 12, in which the inductor currents iL1, iL2 begin to flow in the normal direction from the smoothing capacitor Co1 to the inductors L1, L2. After that, the above-described operations are repeated to achieve zero-voltage switching of all of the switching elements Ss1, S1, Ss2, S2 while keeping the output voltage Vo2 constant.

Thus, also in this embodiment, in the event of a power failure or instantaneous power failure, the output voltage Vo2 generated across the smoothing capacitor Co2 can be kept constant by performing the above-described series of operations while controlling the duty ratio of the switching elements Ss1, S1, Ss2, S2. This stabilizes the output voltage Vo2 of the PFC converter, facilitating designing a power supply circuit to be subsequently connected to the PFC converter.

As described above, the PFC converter in accordance with this embodiment is configured as follows. The first converter section PFC1 is configured such that the series circuit of the first inductor L1 and the first switching element 51 is connected between the input terminals of the converter section PFC1, and the series circuit of the switching element S1 and the third switching element Ss1 is connected across the capacitor Co1. The second converter section PFC2 is configured such that the series circuit of the second inductor L2 and the second switching element S2 is connected between the input terminals of the converter section PFC2, and the series circuit of the switching element S2 and the fourth switching element Ss2 is connected across the capacitor Co2. When the commercial power supply E operates normally, the switching elements S1, S2 are caused to perform switching operation. And when the voltage of the commercial power supply E drops, the following operations are performed in this order: in the period from t0 to t1, the switching elements S2, Ss1 are set to ON and the switching elements S1, Ss2 are set to OFF to store energy from the capacitor Co1 in the inductors L1, L2; in the period from t1 to t2, the switching element Ss1 is set to ON and the switching elements S1, S2, Ss2 are set to OFF to completely discharge energy stored across the switching element Ss2; in the period from t2 to t3, the switching elements Ss1, Ss2 are set to ON and the switching elements S1, S2 are set to OFF to discharge energy stored in the inductors L1, L2 and the capacitor Co1 to the capacitor Co2; in the period from t3 to t4, the switching element Ss2 is set to ON and the switching elements 51, S2, Ss1 are set to OFF to completely discharge energy stored across the switching element S1; in the period from t4 to t5, the switching elements S1, Ss2 are set to ON and the switching elements S2, Ss1 are set to OFF to discharge energy stored in the inductors L1, L2 to the capacitor Co2; in the period from t5 to t6, the switching element S1 is set to ON and the switching elements S2, Ss1, Ss2 are set to OFF to completely discharge energy stored across the switching element S2; in the period from t6 to t7, the switching elements S1, S2 are set to ON and the switching elements Ss1, Ss2 are set to OFF; and in the period from t7 to t8 (0), the switching element S2 is set to ON and the switching elements S1, Ss1, Ss2 are set to OFF to completely discharge energy stored across the switching element Ss1.

With this configuration, when the voltage of the commercial power supply E drops, setting only one of the switching elements S1, S2, Ss1, Ss2 to ON allows the one of the switching elements S1, S2, Ss1, Ss2 to be turned ON with the voltages between the drain and source of the switching elements S1, S2, Ss1, Ss2 reduced to zero, thereby suppressing the switching loss and surge voltage of all of the switching elements S1, S2, Ss1, Ss2.

Fifth Embodiment

Figure 22:
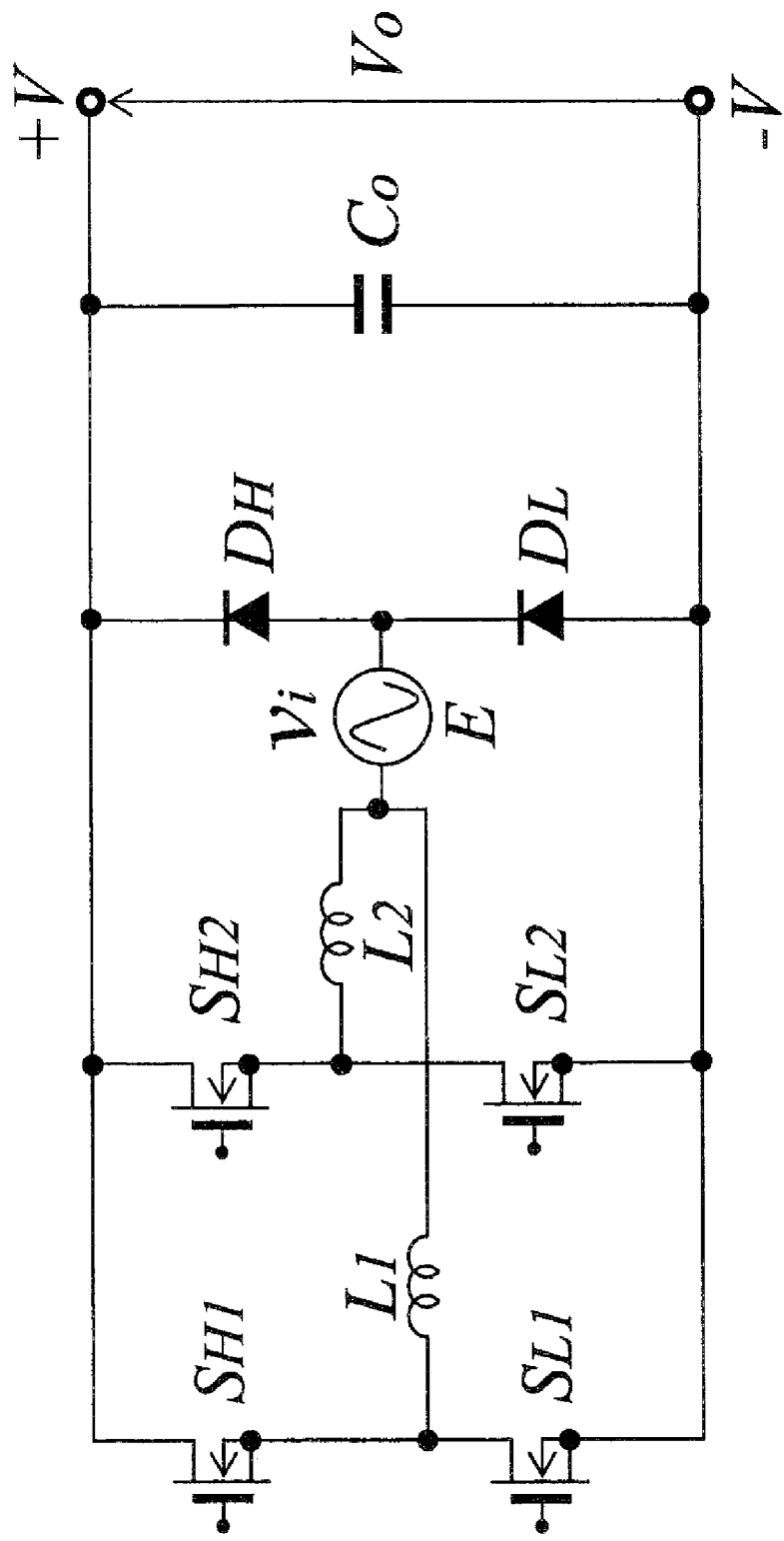
FIG. 22 is a circuit diagram showing a bridge-diode-less two-phase PFC converter known in prior art.
Figure 23:
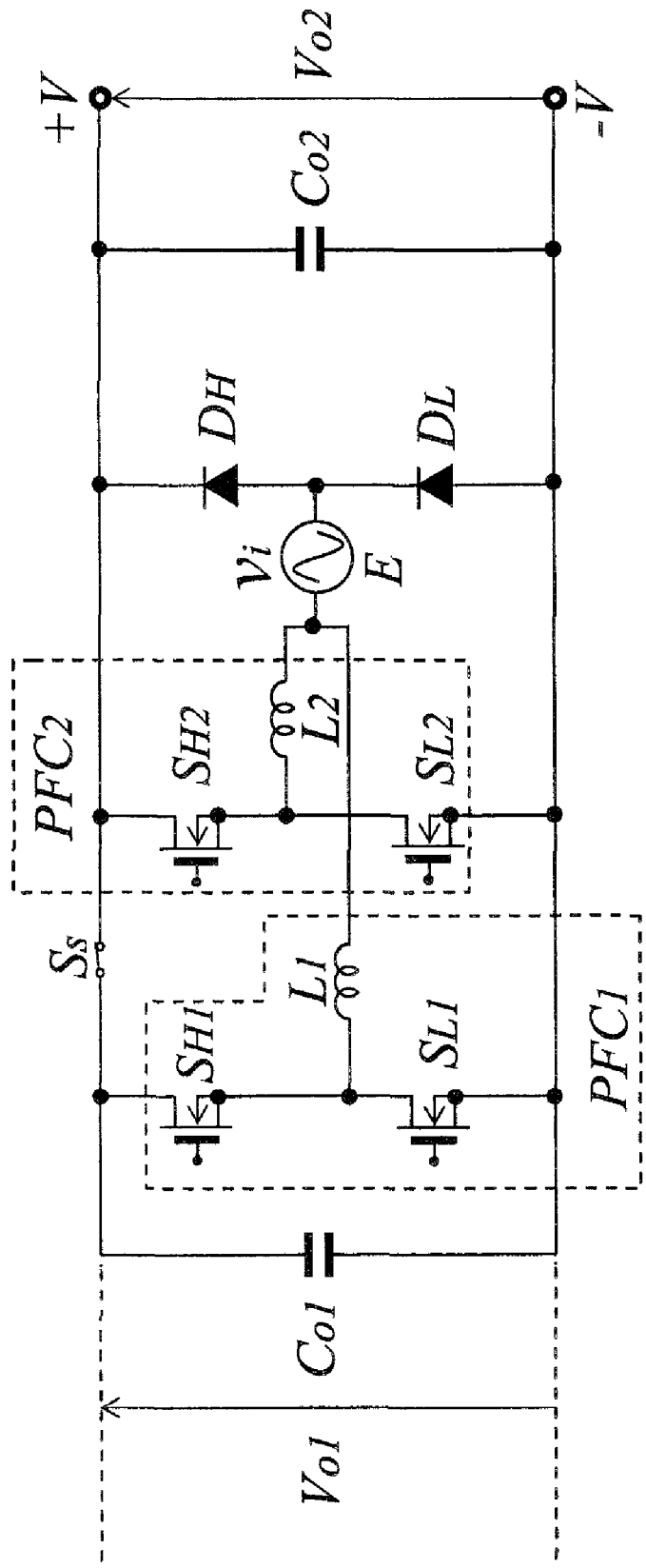
FIG. 23 is a circuit diagram of a PFC converter in accordance with a fifth embodiment of the invention.
Figure 24:
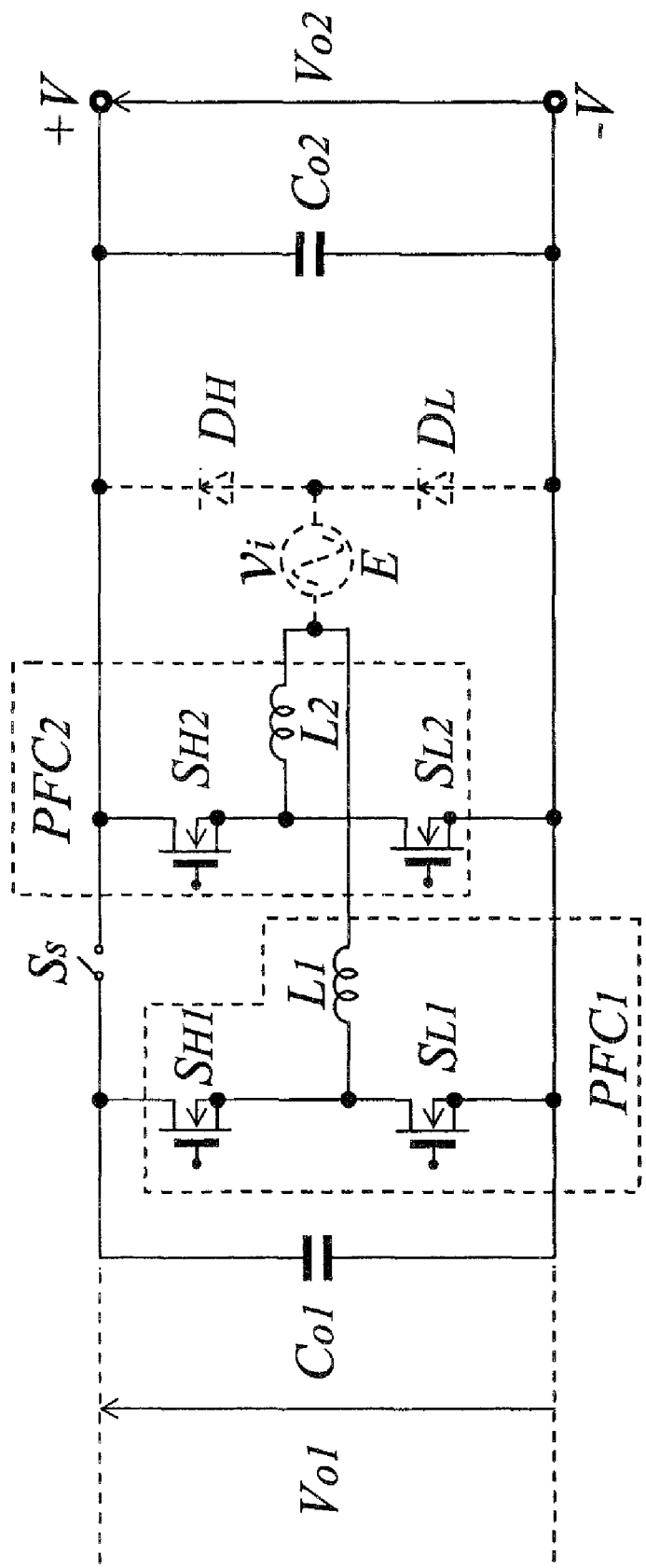
FIG. 24 is a circuit diagram showing an operating state of the circuit in FIG. 23 in the event of a power failure or instantaneous power failure.
Figure 25:
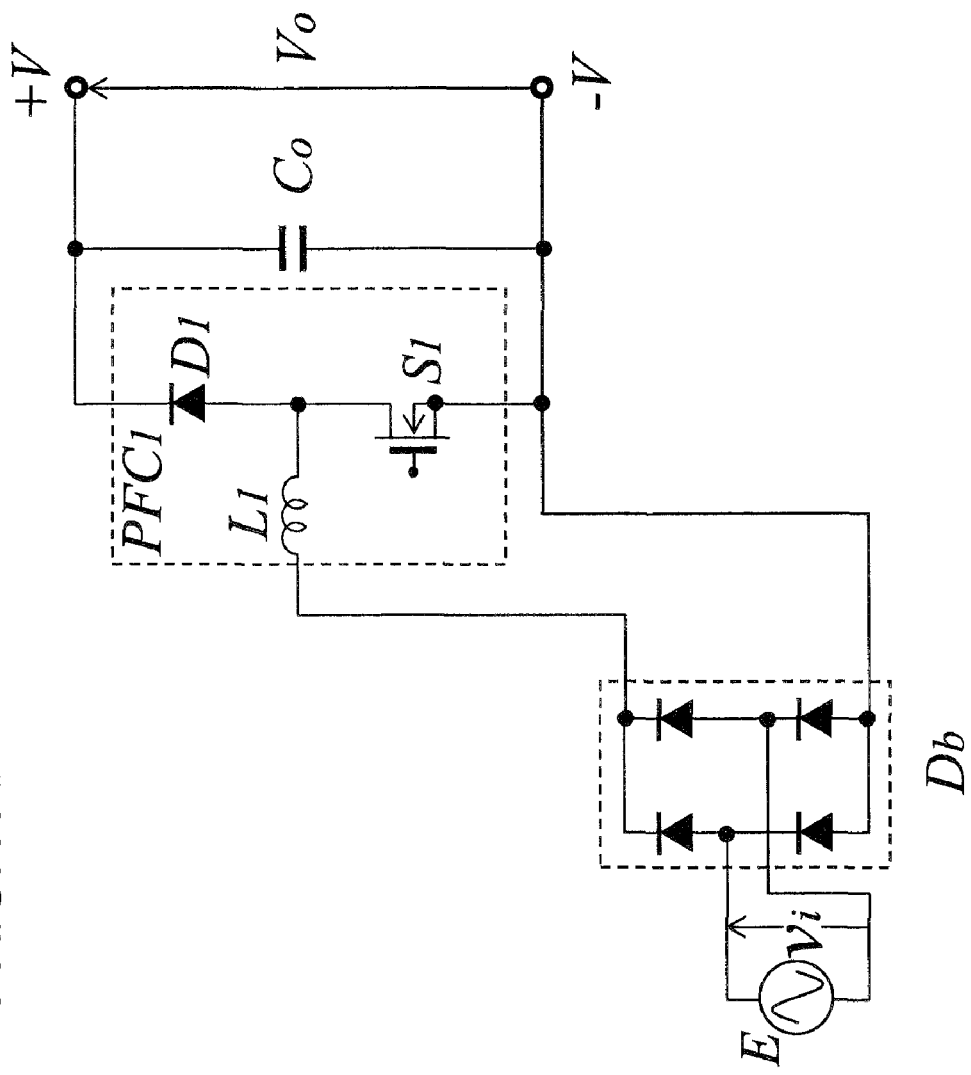
FIG. 25 is a circuit diagram of a PFC converter known in prior art.

FIG. 22 shows an existing bridge-diode-less two-phase PFC converter. On the other hand, FIG. 23 shows a PFC converter proposed with a fifth embodiment of the invention. In this circuit, a single smoothing capacitor CO in the existing circuit is divided into two smoothing capacitors Co1, Co2 and a switch Ss as a second switch is added, which allows boost operation similar to that of the above-described circuits shown in FIGS. 1, 4 and 10. When the commercial power supply E operates normally, the switch Ss is set to ON as shown in FIG. 23. In the event of a power failure or instantaneous power failure of the commercial power supply E, the switch Ss is set to OFF as shown in FIG. 24.

More specifically, in FIG. 23, to one end of the commercial power supply E, one end of the first inductor L1 and one end of the second inductor L2 are connected; to the other end of the commercial power supply E, the anode of a first rectification element DH and the cathode of a second rectification element DL are connected. In other words, in the fifth embodiment, unlike the first to fourth embodiments, the AC input line from the commercial power supply E is directly connected to the PFC converter.

Also, the other end of the inductor L1 is connected to the connecting point of the series circuit of a first low-side switching element SL1 and a first high-side switching element SH1; the other end of the inductor L2 is connected to the connecting point of the series circuit of a second low-side switching element SL2 and a second high-side switching element SH2. The series circuit of the switching elements SH1, SL1 is connected across the first smoothing capacitor Co1; the series circuit of the switching elements SH2, SL2 is connected across the second smoothing capacitor Co2. Across the smoothing capacitor Co2, the series circuit of the rectification elements DH, DL is also connected. The switching elements SH1, SL1 and the inductor L1 form the first converter section PFC1; the switching elements SH2, SL2 and the inductor L2 form the second converter section PFC2.

The converter section PFC1 generates the output voltage Vo1 higher than the input voltage Vi across the smoothing capacitor Co1 through the switching operation of the switching elements SH1, SL1; the converter section PFC2 generates the output voltage Vo2 higher than the input voltage Vi across the smoothing capacitor Co2 through the switching operation of the switching elements SH2, SL2. In this circuit, the output terminals +V, −V are connected across the second smoothing capacitor Co2. A power supply circuit connected to the output terminals +V, −V is configured to supply a desired power to various electronic devices.

Also, the series circuit of the switching elements SH1, SL1 and the series circuit of the switching elements SH2, SL2 are connected to each other through the switch Ss. The operation of the switching elements SH1, SL1 SH2 SL2 and switch Ss are individually controlled by the control circuit not shown. Specifically, as described above, the switch Ss is set to ON when the commercial power supply E operates normally, and is set to OFF in the event of a power failure or instantaneous power failure of the commercial power supply E.

Next, the operation of the above-described configuration is described. When neither power failure nor instantaneous power failure occurs in the commercial power supply E and a predetermined input voltage Vi is generated, the monitoring and controlling section of the control circuit sets the switch Ss to ON, as shown in FIG. 23. At this time, the control circuit causes the switching elements SH1, SL1 of the converter section PFC1 to alternately perform switching operation, and causes the switching elements SH2, SL2 of the converter section PFC2 to alternately perform switching operation.

Specifically, in the period during which positive input voltage Vi is generated at one end of the commercial power supply E, when the switching element SL1 is set to ON and the switching element SH1 is set to OFF, the switching element SL1 and the rectification element DL conduct, and therefore the energy from the commercial power supply E is stored in the inductor L1. After a while, when the ON/OFF state of the switching elements SH1, SL1 changes, that is, the switching element SL1 is set to OFF and the switching element Sill is set to ON, the switching element S111 and the rectification element DL conduct, and therefore, the energy stored in the inductor L1 is discharged to the smoothing capacitors Co1, Co2, generating across the smoothing capacitor Co1 the output voltage Vo1 higher than the input voltage Vi and generating across the smoothing capacitor Co2 the output voltage Vo2 higher than the input voltage Vi. After that, the switching element SL1 is set to ON and the switching element SH1 is set to OFF again, then, storing energy in the inductor L1 and discharging energy from the inductor L1 is repeated.

Similarly, when the switching element SL2 is set to ON and the switching element SH2 is set to OFF, energy from the commercial power supply E is stored in the inductor L2. After a while, when the switching element SL2 is set to OFF and the switching element SH2 is set to ON, energy stored in the inductor L2 is discharged to the smoothing capacitors Co1, Co2, and as a result, the output voltage Vo1 higher than the input voltage Vi is generated across the smoothing capacitor Co1 and besides the output voltage Vo2 higher than the input voltage Vi is generated across the smoothing capacitor Co2. After that, the switching element SL2 is set to ON and the switching element SH2 is set to OFF again, then, storing energy in the inductor L2 and discharging energy from the inductor L2 is repeated.

On the other hand, in the period during which negative input voltage Vi is generated at one end of the commercial power supply E, when the switching element SH1 is set to ON and the switching element SL1 is set to OFF, the switching element SH1, the rectification element DH and the switch Ss conduct, and therefore the energy from the commercial power supply E is stored in the inductor L1. After a while, when the switching element SH1 is set to OFF and the switching element SL1 is set to ON, the switching element SL1 and the rectification element DH conduct, and therefore, the energy stored in the inductor L1 is discharged to the smoothing capacitors Co1, Co2, generating the output voltage Vo1 higher than the input voltage Vi across the smoothing capacitor Co1 and generating the output voltage Vo2 higher than the input voltage Vi across the smoothing capacitor Co2. After that, the switching element SL1 is set to ON and the switching element SH1 is set to OFF again, then, storing energy in the inductor L1 and discharging energy from the inductor L1 is repeated.

Similarly, when the switching element SH2 is set to ON and the switching element SL2 is set to OFF, energy from the commercial power supply E is stored in the inductor L2. After a while, when the switching element SH is set to OFF and the switching element SL2 is set to ON, energy stored in the inductor L2 is discharged to the smoothing capacitors Co1, Co2, which generates Co1 the output voltage Vo1 higher than the input voltage Vi across the smoothing capacitor and generates Co2 the output voltage Vo2 higher than the input voltage Vi across the smoothing capacitor. After that, the switching element SH2 is set to ON and the switching element SL2 is set to OFF again, then, storing energy in the inductor L2 and discharging energy from the inductor L2 is repeated.

In this way, causing the switching elements SH1, SL1 and the switching elements SH2, SL2 to alternately perform ON/OFF switching operation allows the desired output voltages Vo1 and Vo2 to be supplied from a power supply circuit connected between the output terminals +V, −V to various electronic devices. Also, in the above-described series of operations, the pulse widths of pulse drive signals to be provided to the switching elements SH1, SL1, SH2, SL2 are determined such that the waveform and phase of the input current from the commercial power supply E will be similar to the waveform and phase of the input voltage Vi, thus enabling the correction of power factor.

Next, the operation in the event of a power failure or instantaneous power failure of the commercial power supply E is described with reference to FIG. 24. When the input voltage Vi drops below a predetermined value, the AC power supply E and the rectification elements DH, DL are equivalently disconnected from the PFC converter. At this time, the monitoring and controlling section of the control circuit sets the switch Ss to OFF. Then, the operation of setting the switching elements SH1, SL2 to ON and setting the switching elements SH2, SL1 to OFF to store energy from the smoothing capacitor Co1 in the inductors L1, L2, and the operation of setting the switching elements SH1, SH2 to ON and setting the switching elements SL1, SL2 to OFF to discharge energy from the smoothing capacitor Co1 and the inductors L1, L2 to the smoothing capacitor Co2 are repeated.

In the above-described series of operations, the configuration for achieving zero-current switching as described with the second embodiment may be used. In this case, the switching elements SH1, SH2 are set to ON and the switching elements SL1, SL2 are set to OFF. Then, the switching elements SH1, SL2 are set to OFF and the switching elements SH2, SL1 are set to ON to completely discharge energy stored in the inductors L1, L2 until the inductor currents iL1, iL2 is reduced to zero. Then, the switching elements SH1, SL2 are set to ON and the switching elements SL1, SH2 are set to OFF. In this way, zero-current switching is achieved, that is, the switching elements SL1, SH2 are set to OFF and the switching elements SH1, SL2 are turned ON with no current flow, which can suppress the switching loss and surge voltage of the switching elements SH1, SH2, SL1, SL2.

As another example, the configuration for achieving zero-voltage switching as described with the fourth embodiment may be used. In this case, first, the switching elements SH1, SL2 are set to ON and the switching elements SH2, SL1 are set to OFF to store energy from the smoothing capacitor Co1 in the inductors L1, L2. Then, the switching element SL2 (FET, for example) is set to OFF to completely discharge energy stored in the capacitance between the drain and source of the switching elements SH2 by the inductor currents iL1, iL2 flowing from the smoothing capacitor Co1 to the inductors L1, L2. Then, by turning the switching element SH2 ON at the timing of the inductor currents iL1, iL2 flowing through the body diode of the switching element SH2, the zero-voltage switching of the switching element Ss2 can be achieved.

In this period, since the switching elements SH1, SH2 are set to ON and the switching elements SL1, SL2 are set to OFF, energy stored in the inductors L1, L2 and the smoothing capacitor Co1 is discharged to the smoothing capacitor Co2. Then, in the next period, the switching element SH1 is set to OFF to completely discharge energy stored in the capacitance between the drain and source of the switching element SL1 comprised of an FET, for example, by the inductor currents iL1, iL2 flowing from the inductors L1, L2 to the smoothing capacitor Co2. Then, by turning the switching element SL1 ON at the timing of the inductor currents iL1, iL2 flowing through the body diode of the switching element SL1, the zero-voltage switching of the switching element SL1 can be achieved.

In this period, since the switching elements SL1, SH2 are set to ON and the switching elements SH1, SL2 are set to OFF, energy stored in the inductors L1, L2 is discharged to the smoothing capacitor Co2, which reduces the inductor currents iL1, iL2. After a while, the inductor currents iL1, iL2 begin to flow in the reverse direction. At this time, the switching element SH2 is set to OFF to completely discharge energy stored in the capacitance between the drain and source of the switching element SL2 comprised of an FET, for example, by the inductor currents iL1, iL2 flowing in the reverse direction. Then, by turning the switching element SL2 ON at the timing of the inductor currents iL1, iL2 in the reverse direction flowing through the body diode of the switching element SL2, the zero-voltage switching of the switching element SL2 can be achieved.

After the switching element SL2 is set to ON, the switching element SL1 is set to OFF to completely discharge energy stored in the capacitance between the drain and source of the switching element SH1 comprised of an FET, for example, by the inductor currents iL1, iL2 flowing in the reverse direction. Then, by turning the switching element SH1 ON at the timing of the inductor currents iL1, iL2 in the reverse direction flowing through the body diode of the switching element SH1, the zero-voltage switching of the switching element SH1 can be achieved.

When the switching element SH1 is set to ON, energy stored in the inductors L1, L2 is discharged to the smoothing capacitor Co1, which reduces the inductor currents iL1, iL2 in the reverse direction. After a while, returning to the first state, the inductor currents iL1, iL2 in the normal direction begin to flow from the smoothing capacitor Co1 to the inductors L1, L2, and after that, the above-described operations are repeated. In this way, zero-voltage switching of all of the switching elements SH1, SL1, SH2, SL2 is achieved while keeping the output voltage Vo2 constant.

Also in this embodiment, like previously-described embodiments, in the event of a power failure or instantaneous power failure, the output voltage Vo2 generated across the smoothing capacitor Co2 can be kept constant by performing the above-described series of operations while controlling the duty ratio of the switching elements SH1 SL1 SH2 SL2. This stabilizes the output voltage Vo2 of the PFC converter, facilitating designing a power supply circuit to be subsequently connected to the PFC converter.

In this embodiment, AC voltage from the commercial power supply E, in place of rectified voltage from the diode bridge Db in the first to fourth embodiments, is input to the converter sections PFC1, PFC2 connected in parallel to each other. Accordingly, the PFC converter in accordance with this embodiment provides the effects similar to those of the fourth embodiment. Note that the first low-side switching element SL1, the first high-side switching element SH1, the second low-side switching element SL2 and the second high-side switching element SH2 in this embodiment correspond to the first switching element, the third switching element, the second switching element and the fourth switching element, respectively.

Also in this embodiment, the converter sections PFC1, PFC2 may be configured and caused to operate as described with the first to the third embodiments.

Also, the PFC converter in accordance with this embodiment is configured such that the output terminals of the converter section PFC1 are connected to the output terminals of the converter section PFC2 through the switch Ss, and, when the commercial power supply E operates normally, the switch Ss is set to ON, and, when the voltage of the commercial power supply E drops, the switch Ss is set to OFF.

With this configuration, when the commercial power supply E operates normally, the switch Ss is set to ON to supply power to the load with the converter sections PFC1, PFC2 connected in parallel to each other. On the other hand, when the voltage of the commercial power supply E drops, the switch Ss is set to OFF to prevent energy from returning from the smoothing capacitor Co2 to the smoothing capacitor Co1 and to efficiently supply power to the load.

Note that such a switch Ss may be used in the first to fourth embodiments. Also, a switching element such as an FET may be used in place of the switch Ss as switch.

While specific embodiments have been described above as being associated with the PFC converter of the invention, the invention is not intended to be limited to the embodiments. Various modifications and improvements can be added to the configuration and functionality of the PFC converter or boost converter in accordance with the above-described embodiments by those skilled in the art without departing from the spirit of the invention.

For example, in those embodiments, one converter section PFC1 and one converter section PFC2 are connected in parallel to each other. However, alternatively, the PFC converter may include a plurality of first converter sections PFC1 connected in parallel to each other and/or a plurality of second converter sections PFC2 connected in parallel to each other. Also, each of the smoothing capacitors Co1, Co2 may include a plurality of capacitors connected in parallel to each other depending on each desired capacitance. Also, in those embodiments, the converter sections PFC1, PFC2 provide the same output voltages Vo1, Vo2 to one and the same load. However, alternatively, the converter sections PFC1, PFC2 may generate different output voltages Vo1, Vo2 and provide the output voltages Vo1, Vo2 to different loads.

Also, the configuration and operation after the recovery of the commercial power supply E described with the first embodiment may be applied to the second to fifth embodiments if needed.

INDUSTRIAL APPLICABILITY

The present invention will make a great contribution to power supply units in general including a PFC converter. Specifically, a PFC converter suggested herein can stabilize the output voltage to provide a sufficient length of output holding time without using a large-capacity smoothing capacitor. Also, since the input voltage to a power supply circuit connected to the subsequent stages is stabilized, lower-maximum-rating-voltage devices can be used for the power supply circuit to make it to be efficient, small in size and lightweight, and low-cost. Particularly, if the power supply unit does not need high-speed load response characteristics, the power supply circuit connected to the subsequent stages of the PFC converter does not need any regulation function, which will make a great contribution to making the power supply circuit to be efficient, small in size, lightweight and low-cost.

DESCRIPTION OF REFERENCE NUMERALS

E commercial power supply (input power supply)
PFC1 first converter section
PFC2 second converter section Co1 smoothing capacitor (first capacitor)
Co2 smoothing capacitor (second capacitor)
L1 first inductor
L2 second inductor
Ss switch, third switching element (switch)
S1 first switching element
S2 second switching element
Ss1 third switching element
Ss2 fourth switching element
SL1 first low-side switching element (first switching element)
SL2 second low-side switching element (second switching element)
SH1 first high-side switching element (third switching element)
SH2 second high-side switching element (fourth switching element)

The invention claimed is:

1. A power factor correction device with two parallel-connected converter sections, comprising:
a first converter section and a second converter section, connected in parallel with each other, to which AC voltage or rectified voltage from an input power supply is input;
a first capacitor connected across positive and negative output terminals of the first converter section; and
a second capacitor connected across positive and negative output terminals of the second converter section,
wherein when the input power supply operates normally, the first and second converter sections are allowed to operate as a parallel-connected power factor correction converter to transmit energy from the input power supply to the first and second capacitors, respectively, so that stabilized output voltages are supplied from the first and second capacitors to a load, and
wherein when a voltage of the input power supply drops, the second converter section is allowed to operate to transmit energy from the first capacitor, so that stabilized output voltages are supplied from the second capacitor to the load,
wherein the first converter section is configured such that a series circuit of a first inductor and a first switching element is connected across the input terminals of the first converter section, and a series circuit of a first switching element and a first rectification element is connected across both terminals of the first capacitor, while the second converter section is configured such that a series circuit of a second inductor and a second switching element is connected across input terminals of the second converter section, and a series circuit of a second switching element and a second rectification element is connected across both terminals of the second capacitor, and
wherein a first switch is connected in parallel with the first rectification element and when the input power supply operates normally, the first switch is turned off and the first and second switching elements are allowed to perform a switching operation, whereas when a voltage of the input power supply drops, the first switch is turned on and the second switching element is allowed to perform a switching operation.

2. The power factor correction device with two parallel-connected converter sections according to claim 1,
wherein the first switch is comprised of a third switching element,
wherein when the input power supply operates normally, the third switching element is turned off and the first and second switching elements are allowed to perform a switching operation, whereas when a voltage of the input power supply drops, the third switching element is turned on and the second switching element is allowed to perform a switching operation, and before the second the switching element is turned on, the first switching element is temporarily turned on and the third switching is temporarily turned off so that energy stored in the first and second inductors is completely discharged.

3. The power factor correction device with two parallel-connected converter sections according claim 2, wherein when the voltage of the input power supply drops, the first and third switching elements are both turned off so that energy stored across both end of the first switching element is completely discharged before the first switching element turns on.

4. A power factor correction device with two parallel-connected converter sections, comprising:
a first converter section and a second converter section, connected in parallel with each other, to which AC voltage or rectified voltage from an input power supply is input,
a first capacitor connected across positive and negative output terminals of the first converter section, and
a second capacitor connected across positive and negative output terminals of the second converter section,
wherein when the input power supply operates normally, the first and second converter sections are allowed to operate as a parallel-connected power factor correction converter to transmit energy from the input power supply to the first and second capacitors, respectively, so that stabilized output voltages are supplied from said first and second capacitors to a load, whereas a voltage of the input power supply drops, the second converter section is allowed to operate to transmit energy from the first capacitor to the second capacitor, so that stabilized output voltages from the second capacitor to the load,
wherein the first converter section is configured such that a series circuit of a first inductor and a first switching element is connected across input terminals of the first converter section, and a series circuit of a first switching element and a third switching element is connected across both terminals of the first capacitor,
wherein the second converter section is configured such that a series circuit of a second inductor and a fourth switching element is connected across input terminals of the second converter section, and a series circuit of the second switching element and a fourth switching element is connected across both terminals of the second capacitor,
wherein when the input power supply operates normally, the first and second switching elements are allowed to perform a switching operation,
wherein when a voltage of the input power supply drops, the following operations are performed in this order:
in a first period, the second and third switching elements are turned on and the first and the fourth switching elements are turned off to store energy from the first capacitor into the first and second inductors;
in a second period, the third switching element is turned on and the first, second and fourth switching elements are turned off to completely discharge the energy stored across the fourth switching element;
in a third period, the third and fourth switching elements are turned on and the first and second switching elements are turned off to completely discharge the energy stored in the first and second inductors and the first capacitor into the second capacitor;

in a fourth period, the fourth switching element is turned on and the first, second and third switching elements are turned off to completely discharge the energy stored across the first switching element;

in a fifth period, the first and fourth switching elements are turned on and the second and third switching elements are turned off to completely discharge the energy stored in the first and second inductor into the second capacitor;

in a sixth period, the first switching element is turned on and third and fourth switching elements are turned off to completely discharge the energy stored across the second switching element;

in a seventh period, the first and second switching elements are turned on and the third and fourth switching elements are turned off; and in an eighth period, the second switching element is turned on and the first, third and fourth switching elements are turned off to completely discharge the energy stored across the third switching element.

5. A power factor correction device with two parallel-connected converter sections, comprising:

a first converter section and a second converter section, connected in parallel with each other, to which AC voltage or rectified voltage from an input power supply is input, a first capacitor connected across positive and negative output terminals of the first converter section, and a second capacitor connected across positive and negative output terminals of the second converter section, wherein when the input power supply operates normally, the first and second converter sections are allowed to operate as a parallel-connected power factor correction converter to transmit energy from the input power supply to the first and second capacitors, so that stabilized output voltages are supplied from the first and second capacitors to a load, whereas when a voltage of the input power supply drops, the second converter section is allowed to operate to transmit energy from the first capacitor to the second capacitor, so that stabilized voltages are supplied from the second capacitor to the load, wherein the first converter section is configured such that a series circuit of a first switching element and a third switching element is connected across both terminals of the first capacitor, and a first inductor is connected with a connecting point of the first and third switching elements and one end of the input power supply, while the second converter section is configured such that a series circuit of a second and fourth switching elements is connected across both terminals of the second capacitor, and a second inductor is connected with a connecting point of the second and fourth switching elements and one end of the input power supply, and a series circuit of a first and second rectification elements is connected across both terminals of the second capacitor, and a connecting point of the first and second rectification elements is connected with the other end of the input power supply, wherein output terminals of the first converter section are connected across output terminals of the second converter section through a second switch, and when the input power supply operates normally, the second switch is turned on, whereas when a voltage of the input power supply drops, the switch is turned off.

6. The power factor correction device with two parallel-connected converter sections according to claim 1, wherein when the input power supply recovers to a normal operation, the first and second converter sections are allowed to operate again, and the first capacitor is charged through the first converter section, and the output voltage is supplied from the second capacitor to the load through the second converter section.

* * * * *